(12) United States Patent
Sekiguchi et al.

(10) Patent No.: US 12,400,682 B2
(45) Date of Patent: Aug. 26, 2025

(54) MAGNETIC RECORDING MEDIUM AND CARTRIDGE

(71) Applicant: Sony Group Corporation, Tokyo (JP)

(72) Inventors: Noboru Sekiguchi, Tokyo (JP); Minoru Yamaga, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/284,685

(22) PCT Filed: Mar. 31, 2022

(86) PCT No.: PCT/JP2022/016730
§ 371 (c)(1),
(2) Date: Sep. 28, 2023

(87) PCT Pub. No.: WO2022/211065
PCT Pub. Date: Oct. 6, 2022

(65) Prior Publication Data
US 2024/0170015 A1   May 23, 2024

(30) Foreign Application Priority Data
Mar. 31, 2021 (JP) .................. 2021-062475

(51) Int. Cl.
G11B 5/78 (2006.01)
G11B 5/706 (2006.01)
(Continued)

(52) U.S. Cl.
CPC ............ *G11B 5/78* (2013.01); *G11B 5/70615* (2013.01); *G11B 5/70678* (2013.01);
(Continued)

(58) Field of Classification Search
None
See application file for complete search history.

(56) References Cited

U.S. PATENT DOCUMENTS 5,478,626 A * 12/1995 Mori ................. G11B 5/716
5,795,642 A *  8/1998 Ishikawa .......... G11B 5/735
(Continued)

FOREIGN PATENT DOCUMENTS

JP    2005251284 A    9/2005
JP    2007279023 A   10/2007
(Continued)

OTHER PUBLICATIONS

International Search Report from corresponding PCT application PCT/JP2022/016730, dated Jun. 21, 2022.

*Primary Examiner* — William J Klimowicz
(74) *Attorney, Agent, or Firm* — K&L Gates LLP

(57) ABSTRACT

Provided is a magnetic recording medium capable of curbing deterioration in electromagnetic conversion characteristics.
A magnetic recording medium with a tape shape includes a substrate that contains polyesters, an underlayer that is provided on the substrate, and a magnetic layer that is provided on the underlayer and contains a magnetic powder. The magnetic recording medium contains a lubricant. An average value of arithmetic average roughnesses Ra of a surface of the magnetic layer is 1.3 nm or less. In a case where an average value of peak half widths of a spacing increase region generated on an entrance side of a glass pseudo head which the magnetic recording medium enters when the magnetic recording medium is slid over the glass pseudo head is set as a spacing index SRL and an average value of peak half widths of a spacing increase region generated in the vicinity of an edge of the magnetic recording medium in a width direction when the magnetic recording medium is slid over the glass pseudo head is set as a spacing index SRT, the spacing index SRL is 35 μm or less and the spacing index SRT is 68 μm or less.

16 Claims, 16 Drawing Sheets

(51) Int. Cl.
*G11B 5/73* (2006.01)
*G11B 23/087* (2006.01)
*G11B 23/107* (2006.01)

(52) U.S. Cl.
CPC ........ *G11B 5/73911* (2019.05); *G11B 23/087* (2013.01); *G11B 23/107* (2013.01)

(56) References Cited

U.S. PATENT DOCUMENTS

| | | | |
|---|---|---|---|
| 6,251,509 B1* | 6/2001 | Kawamata | G11B 5/7356 |
| 2002/0164503 A1* | 11/2002 | Tani | G11B 5/70 |
| 2003/0220123 A1* | 11/2003 | Motohashi | H04M 1/72403 |
| | | | 455/566 |
| 2004/0005479 A1* | 1/2004 | Kitamura | G11B 5/7026 |
| | | | 428/840.2 |
| 2007/0231616 A1* | 10/2007 | Takeda | G11B 5/7368 |
| | | | 428/847.3 |
| 2008/0123102 A1 | 5/2008 | Fujita et al. | |
| 2010/0035086 A1* | 2/2010 | Inoue | G11B 5/70626 |
| | | | 428/812 |
| 2012/0045664 A1* | 2/2012 | Tanaka | G11B 5/78 |
| | | | 428/840.2 |
| 2012/0156524 A1* | 6/2012 | Kawakami | G11B 5/70678 |
| | | | 428/836 |
| 2019/0259416 A1* | 8/2019 | Kawakami | G11B 5/70678 |
| 2019/0304497 A1 | 10/2019 | Kurokawa et al. | |
| 2020/0126588 A1* | 4/2020 | Miura | G11B 5/70678 |
| 2020/0211592 A1* | 7/2020 | Kasada | G11B 5/706 |
| 2022/0399039 A1* | 12/2022 | Terakawa | G11B 5/714 |

FOREIGN PATENT DOCUMENTS

| | | | | |
|---|---|---|---|---|
| JP | 2011181121 A | | 9/2011 | |
| JP | 6624332 B1 | * | 12/2019 | ........... G11B 23/037 |
| JP | 6635215 B1 | * | 1/2020 | ............... C10M 105/24 |
| JP | 6635216 B1 | * | 1/2020 | ............... G11B 5/17 |
| JP | 6838633 B1 | * | 3/2021 | ........... G11B 5/5928 |
| JP | 2021044053 A | | 3/2021 | |

* cited by examiner

MAGNETIC RECORDING MEDIUM AND CARTRIDGE

TECHNICAL FIELD

The present disclosure relates to a magnetic recording medium and a cartridge including the same.

BACKGROUND ART

In recent years, due to the development of information technology (IT) society, and the like, there is a demand for a higher recording density in a tape-shaped magnetic recording medium as a medium for data storage. If short-wavelength recording is performed by reducing a thickness of a magnetic layer in order to meet this demand, electromagnetic conversion characteristics may deteriorate due to a slight deterioration in spacing between a magnetic layer and a magnetic head.

For example, PTL 1 discloses that a surface roughness Ra of an aromatic polyamide film constituting a non-magnetic support is set to 0.2 to 5 nm on a surface on a side on which a magnetic layer is coated. Further, it discloses that when the surface roughness Ra is greater than 5 nm, a surface roughness of a magnetic recording medium after the magnetic layer is coated increases, and spacing loss with a magnetic head increases.

CITATION LIST

Patent Literature

[PTL 1]
JP 2011-181121A

SUMMARY

Technical Problem

As described above, in the related art, curbing the deterioration of the electromagnetic conversion characteristics by adjusting the surface roughness of the surface of the magnetic layer has been studied. However, it is difficult to curb the deterioration of the electromagnetic conversion characteristics by simply adjusting the surface roughness of the surface of the magnetic layer. An object of the present disclosure is to provide a magnetic recording medium capable of curbing deterioration in electromagnetic conversion characteristics and a cartridge including the same.

Solution to Problem

In order to solve the above-described problems, a first disclosure is
a magnetic recording medium with a tape shape, including:
a substrate that contains polyesters;
an underlayer that is provided on the substrate; and
a magnetic layer that is provided on the underlayer and contains a magnetic powder,
wherein the magnetic recording medium contains a lubricant,
wherein an average value of arithmetic average roughnesses Ra of a surface of the magnetic layer is 1.3 nm or less, and
wherein, in a case where an average value of peak half widths of a spacing increase region generated on an entrance side of a glass pseudo head which the magnetic recording medium enters when the magnetic recording medium is slid over the glass pseudo head is set as a spacing index SRL and
an average value of peak half widths of a spacing increase region generated in the vicinity of an edge of the magnetic recording medium in a width direction when the magnetic recording medium is slid over the glass pseudo head is set as a spacing index SRT,
the spacing index SRL is 35 μm or less and the spacing index SRT is 68 μm or less.

A second disclosure is a cartridge including the magnetic recording medium according to the first disclosure.

DESCRIPTION OF EMBODIMENTS

An embodiment of the present disclosure will be described in the following order.
  1 Configuration of Cartridge
  2 Configuration of Cartridge Memory
  3 Configuration of Magnetic Tape
  4 Manufacturing Method of Magnetic Tape
  5 Operations and Effects
  6 Modification Example In this specification, unless a measurement environment is specifically described with respect to a description of a measurement method, measurement is performed under the environment of 25° C.±2° C. and 50% RH±5% RH. Further, in this specification, a numerical range indicated using "to" indicates a range including the numerical values described before and after "to" as the minimum and maximum values, respectively.

1 CONFIGURATION OF CARTRIDGE

Figure 1:
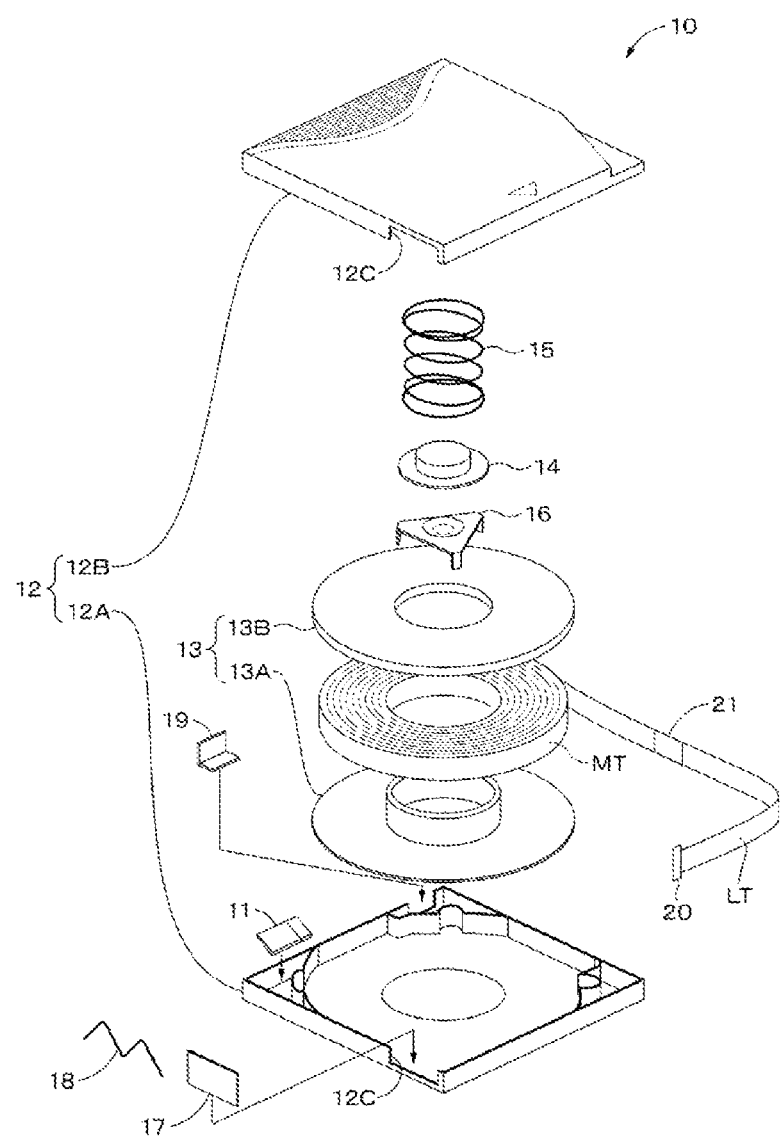
FIG. 1 is an exploded perspective view illustrating an example of a configuration of a cartridge according to an embodiment of the present disclosure.

FIG. 1 is an exploded perspective view illustrating an example of a configuration of a cartridge 10. The cartridge 10 is a one-reel type cartridge and includes, inside a cartridge case 12 constituted by a lower shell 12A and an upper shell 12B, a single reel 13 in which a tape-shaped magnetic recording medium (hereinafter referred to as a "magnetic tape") MT is wound, a reel lock 14 and a reel spring 15 for locking the rotation of the reel 13, a spider 16 for releasing a locked state of the reel 13, a slide door 17 that opens and closes a tape drawing port 12C provided in the cartridge case 12 across the lower shell 12A and the upper shell 12B, a door spring 18 that biases the slide door 17 to a closed position of the tape drawing port 12C, a write protect 19 for preventing erroneous erasure, and a cartridge memory 11. The reel 13 for winding the magnetic tape MT has substantially a disk shape with an opening in the center and is constituted by a reel hub 13A made of a hard material such as plastic and a flange 13B. A leader tape LT is connected to the end portion of the magnetic tape MT on an outer periphery side. A leader pin 20 is provided at the tip end of the leader tape LT.

The cartridge 10 may be a magnetic tape cartridge based on a linear tape-open (LTO) standard or may be a magnetic tape cartridge based on a standard different from the LTO standard.

The cartridge memory 11 is provided in the vicinity of one corner of the cartridge 10. When the cartridge 10 is loaded in a recording and reproducing device, the cartridge memory 11 faces a reader and writer of the recording and reproducing device. The cartridge memory 11 communicates with a recording and reproducing device, specifically, a reader and writer based on a wireless communication standard according to the LTO standard.

2 CONFIGURATION OF CARTRIDGE MEMORY

Figure 2:
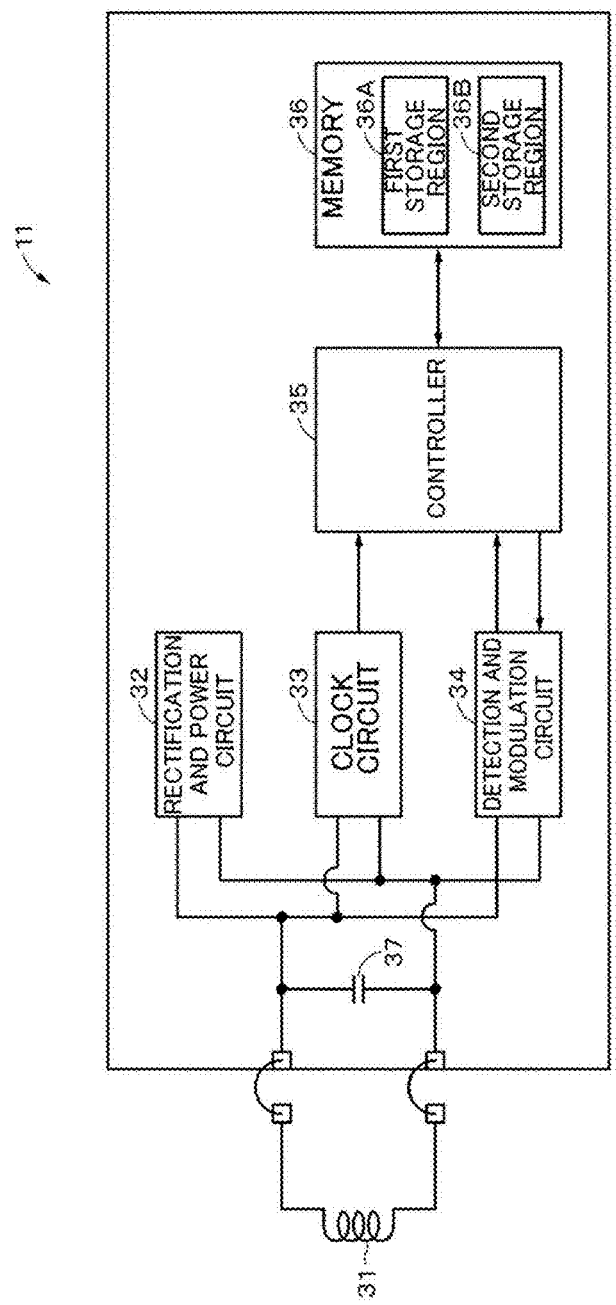
FIG. 2 is a block diagram illustrating an example of a configuration of a cartridge memory.

FIG. 2 is a block diagram illustrating an example of a configuration of the cartridge memory 11. The cartridge memory 11 includes an antenna coil (a communication unit) 31 that communicates with a reader and writer according to a specified communication standard, a rectification and power circuit 32 that generates power by generating and rectifying power from radio waves received by the antenna coil 31 using an induced electromotive force, a clock circuit 33 that similarly generates a clock using an induced electromotive force from radio waves received by the antenna coil 31, a detection and modulation circuit 34 that detects radio waves received by the antenna coil 31 and modulates a signal transmitted by the antenna coil 31, a controller (a control unit) 35 which is constituted by a logic circuit or the like for discriminating a command and data from a digital signal extracted from the detection and modulation circuit 34 and processing the command and data, and a memory (a storage unit) 36 that stores information. In addition, the cartridge memory 11 includes a capacitor 37 which is connected to the antenna coil 31 in parallel, and a resonance circuit is constituted by the antenna coil 31 and the capacitor 37.

The memory 36 stores information related to the cartridge 10 and the like. The memory 36 is a non-volatile memory (NVM). A storage capacity of the memory 36 is preferably approximately 32 KB or more.

The memory 36 may have a first storage region 36A and a second storage region 36B. The first storage region 36A is a region for storing first information. The first information includes, for example, at least one selected from the group consisting of manufacturing information of the cartridge 10 (for example, a unique number of the cartridge 10) and usage history of the cartridge 10 (for example, the number of times the magnetic tape MT has been pulled out (Thread Count)). The second storage region 36B is a region for storing second information. The second information includes, for example, at least one selected from the group consisting of tension adjustment information, management ledger data, index information, thumbnail information, and the like.

The tension adjustment information is information for adjusting tension applied in a longitudinal direction of the magnetic tape MT. The tension adjustment information includes, for example, at least one selected from the group consisting of information obtained by intermittently measuring the width between servo bands in the longitudinal direction of the magnetic tape MT, tension information of the recording and reproducing device, temperature and humidity information of the recording and reproducing device, and the like. This information may be managed in cooperation with information about the usage status of the cartridge 10 and the like. The tension adjustment information is preferably acquired during data recording or before data recording on the magnetic tape MT. The tension information of the recording and reproducing device is information of the tension applied in the longitudinal direction of the magnetic tape MT.

The management ledger data is data including at least one selected from the group consisting of the capacity of a data file recorded on the magnetic tape MT, the date of creation, the date of editing, the storage location, and the like. The index information is metadata or the like for searching for the content of the data file. The thumbnail information is thumbnails of moving images or still images stored on the magnetic tape MT.

The memory 36 may include a plurality of banks. In this case, the first storage region 36A may be constituted by some of the plurality of banks, and the second storage region 36B may be constituted by the remaining banks.

The antenna coil 31 induces an induced voltage by electromagnetic induction. The controller 35 communicates with the recording and reproducing device according to a specified communication standard through the antenna coil 31. Specifically, the controller performs, for example, mutual authentication, transmission and reception of commands, data exchange, and the like.

The controller 35 stores information received from the recording and reproducing device through the antenna coil 31 in the memory 36. For example, tension adjustment information received from the recording and reproducing device through the antenna coil 31 is stored in the second storage region 36B of the memory 36. The controller 35 reads information from the memory 36 in response to a request of the recording and reproducing device and transmits the information to the recording and reproducing device through the antenna coil 31. For example, the controller 35 reads tension adjustment information from the second storage region 36B of the memory 36 in response to a request of the recording and reproducing device and transmits the tension adjustment information to the recording and reproducing device through the antenna coil 31.

3 CONFIGURATION OF MAGNETIC TAPE

Figure 3:
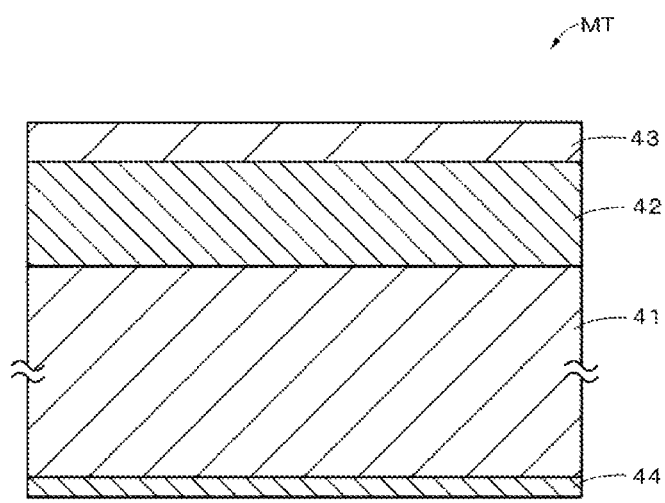
FIG. 3 is a cross-sectional view illustrating an example of a configuration of a magnetic tape.

FIG. 3 is a cross-sectional view illustrating an example of a configuration of the magnetic tape MT. The magnetic tape MT includes a long substrate 41, an underlayer 42 provided on one main surface (a first main surface) of the substrate 41, a magnetic layer 43 provided on the underlayer 42, and a back layer 44 provided on the other main surface (a second main surface) of the substrate 41. Here, the underlayer 42 and the back layer 44 may be provided as necessary or may not be provided. The magnetic tape MT may be a vertical recording type magnetic recording medium, or may be a longitudinal recording type magnetic recording medium. The magnetic tape MT preferably contains a lubricant from the viewpoint of improving running properties. At least one of the underlayer 42 and the magnetic layer 43 may contain the lubricant.

The magnetic tape MT may be a magnetic tape based on the LTO standard or may be a magnetic tape based on a standard different from the LTO standard. The width of the magnetic tape MT may be ½ inch or may be wider than ½ inch. In a case where the magnetic tape MT is a magnetic tape based on the LTO standard, the width of the magnetic tape MT is ½ inch. The magnetic tape MT may have a configuration in which the width of the magnetic tape MT can be kept constant or substantially constant by adjusting the tension applied in the longitudinal direction of the magnetic tape MT during running by means of a recording and reproducing device (a drive).

The magnetic tape MT has a long shape and runs in the longitudinal direction at the time of recording and reproducing. The magnetic tape MT is preferably used in a recording and reproducing device in which a maximum value of a linear recording density is 550 KFCI or more when a signal is recorded. The magnetic tape MT is preferably used in a recording and reproducing device including a ring-type head as a recording head. The magnetic tape MT is preferably used in a recording and reproducing device configured to be able to record data with a data track width of 1500 nm or less or 1000 nm or less.

Figure 4:
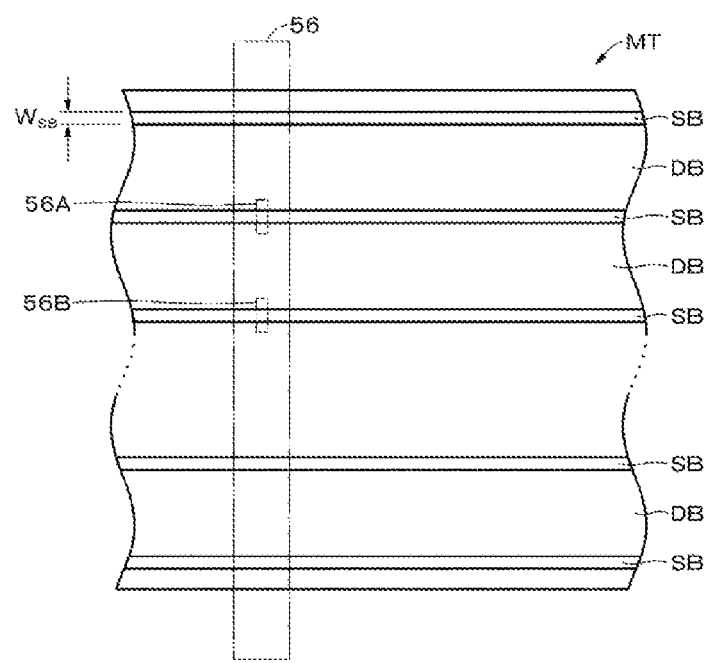
FIG. 4 is a schematic view illustrating an example of a layout of data bands and servo bands.

Data is recorded or reproduced with respect to the magnetic tape MT by a magnetic head 56 as shown in FIG. 4. The magnetic head 56 has a sliding surface on which the magnetic tape MT slides. The sliding surface has a long shape. A recording and reproducing element is provided in the central portion of the sliding surface in a width direction. The width direction of the sliding surface coincides with the longitudinal direction of the magnetic tape MT, that is, the running direction of the magnetic tape MT. A longitudinal direction of the sliding surface coincides with a width direction of the magnetic tape MT.

Figure 12:
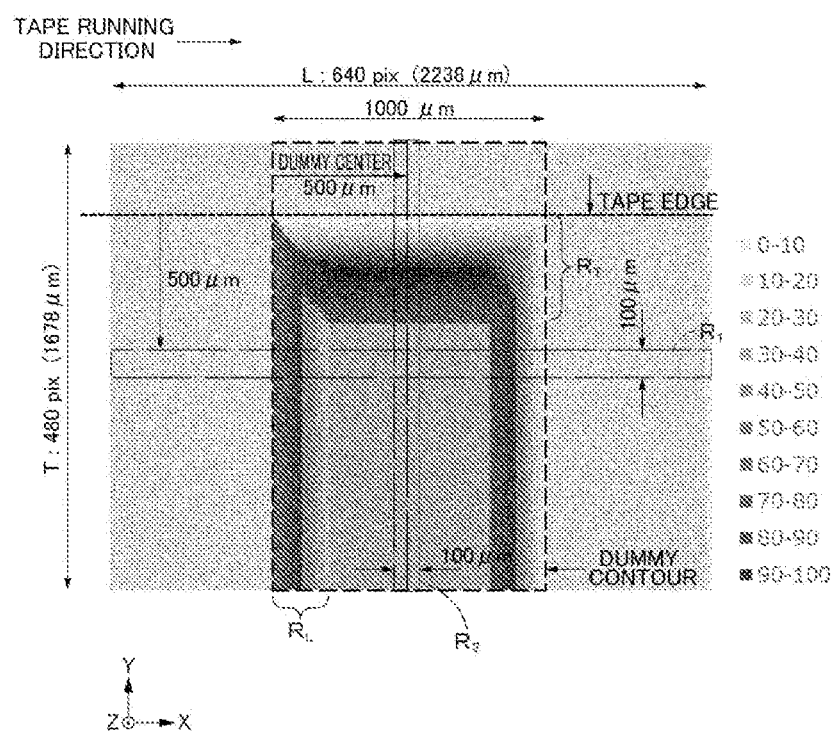
FIG. 12 is a diagram illustrating an example of a 2D profile acquired by the measuring device.

A flat head is preferably used as the magnetic head 56 for performing recording and reproducing with respect to the magnetic tape MT. In the flat head, since the air in the vicinity of the running magnetic tape MT is actively scraped off by an edge of the head before reaching the sliding surface, it is possible to lower the air pressure between the sliding surface of the magnetic head 56 and the magnetic tape MT. Therefore, spacing between the sliding surface of the magnetic head 56 and the magnetic tape MT can be reduced. As a result, $R_L$ and $R_T$ in FIG. 12 are expected to be smaller than when the flat head is not used.

(Substrate)

The substrate 41 is a non-magnetic support that supports the underlayer 42 and the magnetic layer 43. The substrate 41 has a long film shape. The upper limit value of the average thickness $T_s$ of the substrate 41 is, for example, 4.4 µm or less, preferably 4.2 µm or less, more preferably 4.0 µm or less, even more preferably 3.8 µm or less, particularly preferably 3.6 µm or less, and most preferably 3.4 µm or less. When the upper limit value of the average thickness $T_s$ of the substrate 41 is 4.4 µm or less, a recording capacity capable of being recorded in one data cartridge can be increased more than in a general magnetic tape. The lower limit value of the average thickness $T_s$ of the substrate 41 is preferably 3 µm or more, and more preferably 3.2 µm or more. When the lower limit value of the average thickness T of the substrate 41 is 3 µm or more, it is possible to curb a decrease in the strength of the substrate 41.

The average thickness $T_s$ of the substrate 41 is obtained as follows. First, the magnetic tape MT accommodated in the cartridge 10 is unwound, and the magnetic tape MT is cut out to a length of 250 mm from each of a range of 10 m to 20 m, a range of 30 m to 40 m, and a range of 50 m to 60 m in the longitudinal direction from a connecting portion 21 between the magnetic tape MT and the leader tape LT to prepare three samples. In this specification, the term "longitudinal direction" in the case of "the longitudinal direction from the connecting portion 21 between the magnetic tape MT and the leader tape LT" means a direction from one end on a side of the leader tape LT to the other end on a side opposite thereto.

Subsequently, the layers of each sample other than the substrate 41 (that is, the underlayer 42, the magnetic layer 43, and the back layer 44) are removed with a solvent such as methyl ethyl ketone (MEK) or a dilute hydrochloric acid. Next, using a laser hologauge (LGH-110C) manufactured by Mitutoyo Corporation as a measuring device, the thickness of each sample (the substrate 41) is measured at positions of five points, and the measured values (the thicknesses of the samples of a total of 15 points) are arithmetically averaged to calculate the average thickness $T_s$ of the substrate 41. The measurement positions of five points are randomly selected from each sample such that they are different positions in the longitudinal direction of the magnetic tape MT.

The substrate 41 contains, for example, at least one selected from the group consisting of polyesters, polyolefins, cellulose derivatives, vinyl-based resins, and other polymer resins. In a case where the substrate 41 contains two or more of the above materials, these two or more materials may be mixed, copolymerized, or stacked.

The substrate 41 preferably contains polyesters as a main component among the polymer resins described above. When the substrate 41 contains polyesters, it is possible to reduce the average Young's modulus of the substrate 41 in the longitudinal direction to preferably 2.5 GPa or more and 7.8 GPa or less and more preferably 3.0 GPa or more and 7.0 GPa or less. Therefore, when the tension of the magnetic tape MT in the longitudinal direction during running is adjusted by the recording and reproducing device, it is particularly easy to control the width of the magnetic tape MT to be constant or substantially constant. A method of measuring the average Young's modulus of the substrate 41 in the longitudinal direction will be described later.

In this specification, the term "main component" means a component having the highest content rate among the components that constitute the substrate 41. The fact that the main component of the substrate 41 has polyesters may mean that the content rate of the polyesters in the substrate 41 is, for example, 50% by mass or more, 60% by mass or more, 70% by mass or more, 80% by mass or more, 90% by mass or more, 95% by mass or more, or 98% by mass or more with respect to the mass of the substrate 41, or may mean that the substrate 41 is composed only of polyesters.

The polyesters include, for example, at least one selected from the group consisting of polyethylene terephthalate (PET), polyethylene naphthalate (PEN), polybutylene terephthalate (PBT), polybutylene naphthalate (PBN), polycyclohexylene dimethylene terephthalate (PCT), polyethylene-p-oxybenzoate (PEB), and polyethylene bisphenoxycarboxylate. In a case where the substrate 41 contains two or more types of polyesters, these two or more types of polyesters may be mixed, copolymerized, or stacked. At least one of the ends and side chains of the polyesters may be modified.

Whether polyesters are contained in the substrate 41 is identified, for example, as follows. First, the magnetic tape MT accommodated in the cartridge 10 is unwound, and the magnetic tape MT is cut out from a range of 30 m to 40 m in the longitudinal direction from the connecting portion 21 between the magnetic tape MT and the leader tape LT to prepare a sample. Then, the layers other than the substrate 41 are removed. Next, an IR spectrum of the sample (the substrate 41) is acquired by infrared absorption spectrometry (IR). Incorporation of the polyesters into the substrate 41 can be identified based on the IR spectrum.

Polyolefins include, for example, at least one selected from the group consisting of polyethylene (PE) and polypropylene (PP). Cellulose derivatives include, for example, at least one selected from the group consisting of cellulose diacetate, cellulose triacetate, cellulose acetate butyrate (CAB), and cellulose acetate propionate (CAP). The vinyl-based resins include, for example, at least one selected from the group consisting of polyvinyl chloride (PVC) and polyvinylidene chloride (PVDC).

Other polymer resins include, for example, at least one selected from the group consisting of polyamides (PAs, nylon), aromatic polyamides (aromatic PAs, aramids), polyimides (PIs), aromatic polyimides (aromatic PIs), polyamideimides (PAIs), aromatic polyamideimides (aromatic PAIs), polybenzoxazoles (PBOs, for example, Zylon (a trademark)), polyether, polyetherketone (PEK), polyetheretherketone (PEEK), polyetherester, polyethersulfone (PES), polyetherimide (PEI), polysulfone (PSF), polyphenylene sulfide (PPS), polycarbonate (PC), polyarylate (PAR), and polyurethane (PU).

The substrate 41 may be biaxially stretched in the longitudinal direction and the width direction. The polymer resin contained in the substrate 41 is preferably oriented obliquely with respect to the width direction of the substrate 41.

(Magnetic Layer)

The magnetic layer 43 is a recording layer in which a signal is recorded by a magnetization pattern. The magnetic layer 43 may be a vertical recording type recording layer, or may be a longitudinal recording type recording layer. The magnetic layer 43 contains, for example, a magnetic powder and a binding agent. The magnetic layer 43 may further contain, as necessary, at least one additive agent selected from the group consisting of a lubricant, carbon, an antistatic agent, an abrasive, a curing agent, an antirust agent, non-magnetic reinforcing particles, and the like. The magnetic layer 43 has a surface having an uneven shape.

The magnetic layer 43 may have a plurality of servo bands SB and a plurality of data bands DB in advance, as shown in FIG. 4. The plurality of servo bands SB are provided at regular intervals in the width direction of the magnetic tape MT. The data band DB is provided between the adjacent servo bands SB. The servo band SB is for guiding the magnetic head 56 (specifically, servo read heads 56A and 56B) when data is recorded or reproduced. A servo pattern (a servo signal) for tracking control of the magnetic head 56 is written in advance in the servo band SB. User data is recorded in the data band DB.

The upper limit value of the average value of ratios $R_S$ $(=(S_{SB}/S) \times 100)$ of a total area $S_{SB}$ of the plurality of servo bands SB with respect to an area S of a magnetic surface is preferably 4.0% or less, more preferably 3.0% or less, and still more preferably 2.0% or less from the viewpoint of securing a high recording capacity. On the other hand, the lower limit value of the average value of the ratios $R_S$ of the total area $S_{SB}$ of the plurality of servo bands SB with respect to the area S of the surface of the magnetic layer 43 is preferably 0.8% or more from the viewpoint of securing five or more servo bands SB.

The average value of the ratios $R_S$ of the total area $S_{SB}$ of the plurality of servo bands SB with respect to the area S of the entire surface of the magnetic layer 43 is obtained as follows. First, the magnetic tape MT accommodated in the cartridge 10 is unwound, and the magnetic tape MT is cut out to a length of 250 mm from each of a range of 10 m to 20 m, a range of 30 m to 40 m, and a range of 50 m to 60 m in the longitudinal direction from a connecting portion 21 between the magnetic tape MT and the leader tape LT to prepare three samples. Next, each sample is developed using a ferricolloid developer (manufactured by Sigma High Chemical Co., Ltd., SigMarker Q), and then each sample developed is observed with an optical microscope to measure a servo band width $W_{SB}$ and the number of servo bands SB. Next, the ratio $R_S$ of each sample is obtained from the following formula.

$$\text{Ratio } R_S [\%] = (((\text{servo band width } W_{SB}) \times (\text{number of servo bands } SB))/(\text{width of magnetic tape } MT)) \times 100$$

Next, the average value of the ratios $R_S$ is calculated by arithmetically averaging the ratios $R_S$ of the three samples.

The number of servo bands SB is, for example, 5+4n (where, n is an integer of 0 or more) or more. The number of servo bands SB is preferably 5 or more and more preferably 9 or more. When the number of servo bands SB is 5 or more, it is possible to curb the influence on the servo signal due to the change in the size of the magnetic tape MT in the width direction, and it is possible to secure stable recording and reproducing characteristics with fewer off-track errors. The upper limit value of the number of servo bands SB is not particularly limited and is, for example, 33 or less.

The number of servo bands SB is obtained as follows. First, the magnetic tape MT accommodated in the cartridge 10 is unwound, and the magnetic tape MT is cut out to a length of 250 mm from a range of 30 m to 40 m in the longitudinal direction from the connecting portion 21 between the magnetic tape MT and the leader tape LT to prepare a sample. Next, the sample is developed and the number of servo bands SB is measured in the same manner as the method of calculating the ratio $R_S$ described above.

From the viewpoint of securing a high recording capacity, the upper limit value of the average value of the servo band widths $W_{SB}$ is preferably 95 μm or less, more preferably 60 μm or less, and still more preferably 30 μm or less. The lower limit value of the average value of the servo band widths $W_{SB}$ is preferably 10 µm or more. It is difficult to manufacture a magnetic head 56 capable of reading a servo signal of the servo band width $W_{SB}$ of less than 10 µm.

The average value of the servo band widths $W_{SB}$ is obtained as follows. First, the servo band widths $W_{SB}$ of three samples are obtained in the same manner as the method of calculating the ratio $R_S$ described above. Next, the average value of the servo band widths $W_{SB}$ is calculated by arithmetically averaging the servo band widths $W_{SB}$ of the three samples.

Figure 5:
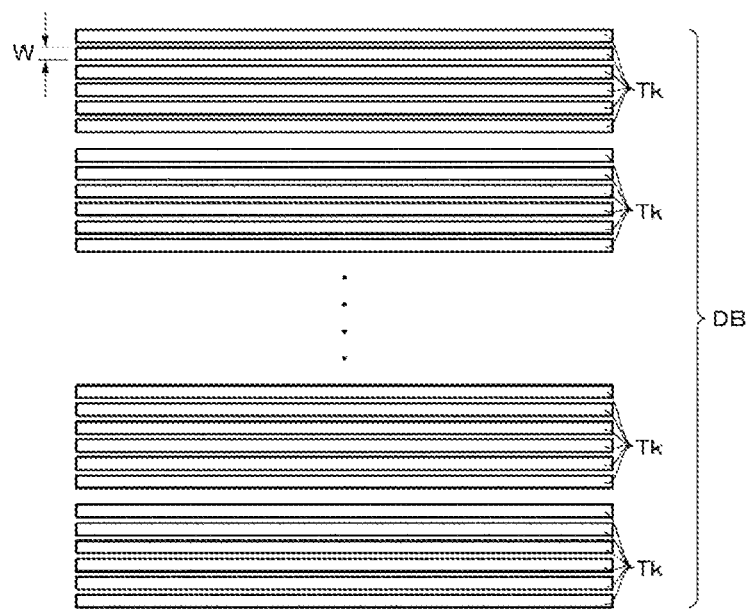
FIG. 5 is an enlarged view illustrating an example of a configuration of a data band.

As illustrated in FIG. 5, the magnetic layer 43 is configured such that a plurality of data tracks Tk can be formed in the data band DB. From the viewpoint of improving a track recording density and securing a high recording capacity, the upper limit value of the data track width W is preferably 1500 nm or less, more preferably 1000 nm or less, still more preferably 800 nm or less, and particularly preferably 600 nm or less. The lower limit value of the data track width W is preferably 20 nm or more in consideration of the magnetic particle size.

From the viewpoint of securing a high recording capacity, the magnetic layer 43 has a configuration in which data can be recorded such that the minimum value L of the distance between magnetization reversals is preferably 40 nm or less, more preferably 36 nm or less, and still more preferably 32 nm or less. The lower limit value of the minimum value L of the distance between magnetization reversals is preferably 20 nm or more in consideration of the magnetic particle size.

The data track width W is obtained as follows. First, a cartridge 10 in which data is recorded on the entire surface of the magnetic tape MT is prepared, the magnetic tape MT from the cartridge 10 is unwound, and the magnetic tape MT is cut out to a length of 250 mm from each of a range of 10 m to 20 m, a range of 30 m to 40 m, and a range of 50 m to 60 m in the longitudinal direction from a connecting portion 21 between the magnetic tape MT and the leader tape LT to prepare three samples. Subsequently, a data recording pattern of the data band DB portion of the magnetic layer 43 of each sample is observed using a magnetic force microscope (MFM) to obtain an MFM image. As the MFM, Dimension 3100 manufactured by Digital Instruments and its analysis software are used. The measurement region of the MFM image is set to 10 µm×10 µm, and the 10 µm×10 µm measurement region is divided into 512×512 (=262,144) measurement points. In each sample, measurement is performed on the 10 µm×10 µm measurement region using the MFM, that is, three MFM images are obtained. From the obtained three MFM images, using the analysis software bundled in Dimension 3100, the track width is measured at 10 locations, and an average value (simple average) is obtained. The average value is the data track width W. The measurement conditions for the above MFM are sweep rate: 1 Hz, chip used: MFMR-20, lift height: 20 nm, and correction: Flatten order 3.

The minimum value L of the distance between magnetization reversals is obtained as follows. First, a cartridge 10 in which data is recorded on the entire surface of the magnetic tape MT is prepared, the magnetic tape MT from the cartridge 10 is unwound, and the magnetic tape MT is cut out to a length of 250 mm from each of a range of 10 m to 20 m, a range of 30 m to 40 m, and a range of 50 m to 60 m in the longitudinal direction from a connecting portion 21 between the magnetic tape MT and the leader tape LT to prepare three samples. Subsequently, a data recording pattern of the data band DB portion of the magnetic layer 43 of each sample is observed using a magnetic force microscope (MFM) to obtain an MFM image. As the MFM, Dimension 3100 manufactured by Digital Instruments and its analysis software are used. The measurement region of the MFM image is set to 2 µm×2 µm, and the 2 µm×2 µm measurement region is divided into 512×512 (=262,144) measurement points. In each sample, measurement is performed on the 2 µm×2 µm measurement region using the MFM, that is, three MFM images are obtained. 50 inter-bit distances are measured from the two-dimensional unevenness chart of the recording pattern of the obtained MFM image. The inter-bit distance is measured using the analysis software bundled in Dimension 3100. The value that is approximately the greatest common divisor of the measured 50 inter-bit distances is the minimum value L of the distance between magnetization reversals. The measurement conditions are sweep rate: 1 Hz, chip used: MFMR-20, lift height: 20 nm, and correction: Flatten order 3.

The servo pattern is a magnetized region, which is formed by magnetizing a specific region of the magnetic layer 43 in a specific direction by a servo write head during magnetic tape manufacture. In the servo band SB, a region of in which no servo pattern is formed (hereinafter referred to as a "non-pattern region") may be a magnetized region in which the magnetic layer 43 is magnetized, or may be a non-magnetized region in which the magnetic layer 43 is not magnetized. In a case where the non-pattern region is a magnetized region, the servo pattern formed region and the non-pattern region may be magnetized in different directions (for example, in directions opposite to each other).

Figure 6:
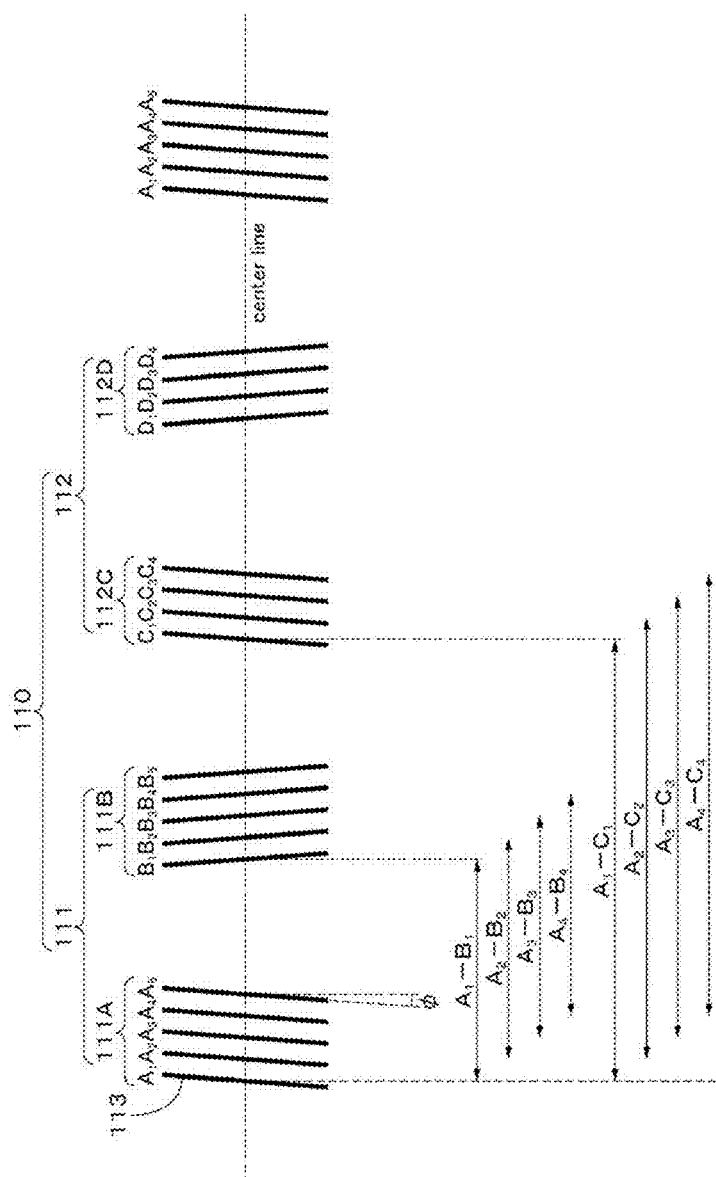
FIG. 6 is an enlarged view illustrating an example of a configuration of a servo band.

In the LTO standard, the servo pattern including a plurality of servo stripes (linear magnetized regions) 113 inclined with respect to the width direction of the magnetic tape MT is formed in the servo band SB as illustrated in FIG. 6.

The servo band SB includes a plurality of servo frames 110. Each servo frame 110 constituted by 18 servo stripes 113. Specifically, each servo frame 110 is constituted by a servo subframe 1 (111) and a servo subframe 2 (112).

The servo subframe 1 (111) is constituted by an A burst 111A and a B burst 111B. The B burst 111B is disposed adjacent to the A burst 111A. The A burst 111A includes five servo stripes 113 formed at specified intervals, which are inclined at a predetermined angle φ with respect to the width direction of the magnetic tape MT. In FIG. 6, these five servo stripes 113 are denoted by reference numerals $A_1$, $A_2$, $A_3$, $A_4$, and $A_5$ from EOT (End Of Tape) to BOT (Beginning Of Tape) of the magnetic tape MT. Similar to the A burst 111A, the B burst 111B includes five servo pulses 63 formed at specified intervals, which are inclined at a predetermined angle φ with respect to the width direction of the magnetic tape MT. In FIG. 6, these five servo stripes 113 are indicated by the reference numerals $B_1$, $B_2$, $B_3$, $B_4$, and $B_5$ from the EOT to the BOT of the magnetic tape MT. The servo stripe 113 of the B burst 111B is inclined in the direction opposite to the servo stripe 113 of the A burst 111A. That is, the servo stripe 113 of the A burst 111A and the servo stripe 113 of the B burst 111B are disposed in an inverted V shape.

The servo subframe 2 (112) includes a C burst 112C and a D burst 112D. The D burst 112D is disposed adjacent to the C burst 112C. The C burst 112C includes four servo stripes 113 formed at specified intervals, which are inclined at a predetermined angle φ with respect to the width direction of the magnetic tape MT. In FIG. 6, these four servo stripes 113 are indicated by the reference numerals $C_1$, $C_2$, $C_3$, and $C_4$ from the EOT to the BOT of the magnetic tape MT. Similar to the C burst 112C, the D burst 112D includes four servo stripes 113 formed at specified intervals, which are inclined at a predetermined angle φ with respect to the width direction of the magnetic tape MT. In FIG. 6, these four servo stripes 113 are indicated by the reference numerals $D_1$, $D_2$, $D_3$, and $D_4$ from the EOT to the BOT of the magnetic tape MT. The servo stripe 113 of the D burst 112D and the servo stripe 113 of the C burst 112C are inclined in directions opposite to each other. That is, the servo stripe 113 of the C burst 112C and the servo stripe 113 of the D burst 112D are disposed in an inverted V shape.

The predetermined angle φ of the servo stripe 113 in the A burst 111A, the B burst 111B, the C burst 112C, and the D burst 112D may be, for example, 110 or more and 400 or less, preferably 110 or more and 360 or less, more preferably 11° or more and 250 or less, and still more preferably 170 or more and 250 or less.

When the servo band SB is read by the magnetic head 56, information for acquiring a tape speed and a longitudinal position of the magnetic head 56 is obtained. The tape speed is calculated from the time between the four timing signals (A1-C1, A2-C2, A3-C3, and A4-C4). The position of the magnetic head 56 is calculated from the time between the above-mentioned four timing signals and the time between the other four timing signals (A1-B1, A2-B2, A3-B3, and A4-B4). The servo pattern may be a shape including two parallel lines.

As illustrated in FIG. 6, it is preferable that the servo patterns (that is, the plurality of servo stripes 113) be linearly arranged in the longitudinal direction of the magnetic tape MT. That is, it is preferable that the servo band SB have a linear shape in the longitudinal direction of the magnetic tape MT.

The upper limit value of the average thickness of the magnetic layer 43 is preferably 80 nm or less, more preferably 70 nm or less, still more preferably 60 nm or less, and particularly preferably 50 nm or less. When the upper limit value of the average thickness of the magnetic layer 43 is 80 nm or less, the influence of a diamagnetic field can be reduced in a case where a ring type head is used as a recording head, and thus it is possible to obtain more excellent electromagnetic conversion characteristics.

The lower limit value of the average thickness of the magnetic layer 43 is preferably 35 nm or more. When the lower limit value of the average thickness of the magnetic layer 43 is 35 nm or more, an output can be secured in a case where an MR type head is used as a reproducing head, and thus it is possible to obtain more excellent electromagnetic conversion characteristics.

The average thickness of the magnetic layer 43 is obtained as follows. First, the magnetic tape MT accommodated in the cartridge 10 is unwound, and the magnetic tape MT is cut out to a length of 250 mm from each of a range of 10 m to 20 m, a range of 30 m to 40 m, and a range of 50 m to 60 m in the longitudinal direction from a connecting portion 21 between the magnetic tape MT and the leader tape LT to prepare three samples. Subsequently, each sample is processed by an FIB method or the like to be sliced. In a case where the FIB method is used, a carbon layer and a tungsten layer are formed as a protective film, which is a pretreatment for observing a cross-sectional TEM image, which will be described later. The carbon layer is formed on a surface of a side of the magnetic layer 43 and on a surface of a side of the back layer 44 of the magnetic tape MT by a vapor deposition method, and the tungsten layer is further formed on a surface of a side of the magnetic layer 43 by a vapor deposition method or a sputtering method. The slicing is performed in a length direction (the longitudinal direction) of the magnetic tape MT. That is, according to the slicing, a cross section parallel to both the longitudinal direction and the thickness direction of the magnetic tape MT is formed.

The cross section of each obtained sliced sample is observed using a transmission electron microscope (TEM) under the following conditions to obtain a TEM image of each sliced sample. Here, the magnification and the acceleration voltage may be appropriately adjusted according to the type of the device.

Device: TEM (H9000NAR manufactured by Hitachi, Ltd.)
Acceleration voltage: 300 kV
Magnification: 100,000 times Next, using the obtained TEM image of each sliced sample, the thickness of the magnetic layer 43 is measured at positions of 10 points on each sliced sample. The measurement positions of 10 points of each sliced sample are randomly selected from each sample such that they are different positions in the longitudinal direction of the magnetic tape MT. The average value obtained by arithmetically averaging the measured values of each obtained sliced sample (the thickness of the magnetic layer 43 at 30 points in total) is taken as the average thickness [nm] of the magnetic layer 43.

(Magnetic Powder)

The magnetic powder includes a plurality of magnetic particles. Each of the magnetic particles are, for example, a particle containing a metal oxide (hereinafter referred to as a "metal oxide particle"). The metal oxide particle is, for example, a particle containing hexagonal ferrite (hereinafter referred to as a "hexagonal ferrite particle"), a particle containing epsilon-type iron oxide (ε-iron oxide) (hereinafter referred to as an "ε-iron oxide particle"), or a particle containing Co-containing spinel ferrite (hereinafter referred to as a "cobalt ferrite particle"). The magnetic powder is preferably crystal-oriented preferentially in a vertical direction of the magnetic tape MT. In this specification, the vertical direction (the thickness direction) of the magnetic tape MT is the thickness direction of the magnetic tape MT in a planar state.

(Hexagonal Ferrite Particle)

The hexagonal ferrite particle has, for example, a plate shape such as a hexagonal plate shape or a columnar shape such as a hexagonal columnar shape (here, a thickness or a height is smaller than a major diameter of a plate surface or a bottom surface). In this specification, the hexagonal plate shape includes a substantially hexagonal plate shape. The hexagonal ferrite contains preferably at least one selected from the group consisting of Ba, Sr, Pb, and Ca and more preferably at least one selected from the group consisting of Ba and Sr. Specifically, the hexagonal ferrite may be, for example, barium ferrite or strontium ferrite. The barium ferrite may further contain at least one selected from the group consisting of Sr, Pb, and Ca in addition to Ba. The strontium ferrite may further contain at least one selected from the group consisting of Ba, Pb, and Ca in addition to Sr.

More specifically, the hexagonal ferrite has an average composition represented by a general formula of $MFe_{12}O_{19}$. Here, M is, for example, at least one metal selected from the group consisting of Ba, Sr, Pb, and Ca, and preferably at least one metal selected from the group consisting of Ba and Sr. M may be a combination of Ba and at least one metal selected from the group consisting of Sr, Pb, and Ca. In addition, M may be a combination of Sr and at least one metal selected from the group consisting of Ba, Pb, and Ca. In the above general formula, some of Fe may be replaced with other metal elements.

In a case where the magnetic powder contains a hexagonal ferrite particle powder, the average particle size of the magnetic powder is preferably 13 nm or more and 22 nm or less, more preferably 13 nm or more and 19 nm or less, still more preferably 13 nm or more and 18 nm or less, particularly preferably 14 nm or more and 17 nm or less, and most preferably 14 nm or more and 16 nm or less. When the average particle size of the magnetic powder is 22 nm or less, further excellent electromagnetic conversion characteristics (for example, SNR) can be obtained in the magnetic tape MT with a high recording density. On the other hand, when the average particle size of the magnetic powder is 13 nm or more, the dispersibility of the magnetic powder is further improved, and further excellent electromagnetic conversion characteristics (for example, SNR) can be obtained.

In a case where the magnetic powder contains a hexagonal ferrite particle powder, the average aspect ratio of the magnetic powder is preferably 1.0 or more and 3.0 or less, more preferably 1.5 or more and 2.8 or less, and still more preferably 1.8 or more and 2.7 or less. When the average aspect ratio of the magnetic powder is in a range between 1.0 or more and 3.0 or less, aggregation of the magnetic powder can be curbed. In addition, when the magnetic powder is vertically oriented in the formation process of the magnetic layer 43, resistance to be applied to the magnetic powder can be curbed. Thus, a vertical orientation property of the magnetic powder can be improved.

In a case where the magnetic powder contains a hexagonal ferrite particle powder, the average particle size and average aspect ratio of the magnetic powder are obtained as follows. First, the magnetic tape MT accommodated in the cartridge 10 is unwound, and the magnetic tape MT is cut out from a range of 30 m to 40 m in the longitudinal direction from the connecting portion 21 between the magnetic tape MT and the leader tape LT. Subsequently, the cut out magnetic tape MT is processed by an FIB method or the like to be sliced. In a case where the FIB method is used, a carbon layer and a tungsten layer are formed as a protective film, which is a pretreatment for observing a cross-sectional TEM image, which will be described later. The carbon layer is formed on a surface of a side of the magnetic layer 43 and on a surface of a side of the back layer 44 of the magnetic tape MT by a vapor deposition method, and the tungsten layer is further formed on a surface of a side of the magnetic layer 43 by a vapor deposition method or a sputtering method. The slicing is performed in a length direction (the longitudinal direction) of the magnetic tape MT. That is, according to the slicing, a cross section parallel to both the longitudinal direction and the thickness direction of the magnetic tape MT is formed.

The cross section of the obtained sliced sample is observed such that the entire magnetic layer 43 is included in the thickness direction of the magnetic layer 43 with an acceleration voltage of 200 kV and a total magnification of 500,000 times using a transmission electron microscope (H-9500 manufactured by Hitachi High Technologies Co., Ltd.), and a TEM photograph is captured. The number of TEM photographs is prepared such that it is possible to extract 50 particles from which a plate diameter DB and a plate thickness DA (see FIG. 7), which will be shown below, can be measured.

Figure 7:
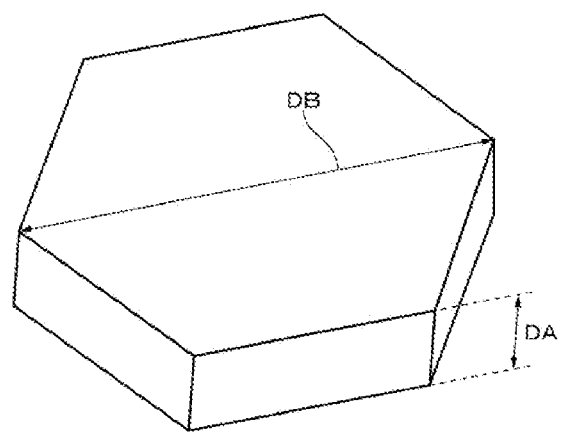
FIG. 7 is a perspective view illustrating an example of the shape of a particle.

In this specification, in a case where the shape of the particle observed in the above TEM photograph is a plate shape or a columnar shape (here, a thickness or height is smaller than a major diameter of a plate surface or bottom surface) as shown in FIG. 7, the major diameter of the plate surface or bottom surface of the particle is set as a value of a plate diameter DB. The thickness or height of the particle observed in the above TEM photograph is set as a value of a plate thickness DA. In a case where the plate surface or bottom surface of the particle observed in the TEM photograph is hexagonal, the major diameter means the longest diagonal distance. In a case where the thickness or height of the particle is not uniform within one particle, the largest thickness or height of the particle is defined as the plate thickness DA.

Next, 50 particles to be extracted from the captured TEM photograph are selected based on the following criteria. A particle partly protruding outside the field of view of the TEM photograph is not measured, but a particle with a clear contour and present in isolation is measured. In a case where particles overlap each other, if a boundary between the two particles is clear and the overall shape of the particle can be determined, each particle is measured as a single particle, but if the boundary is not clear and the overall shape of the particle cannot be determined, each particle is not measured as a particle of which a shape cannot be determined.

Figure 8:
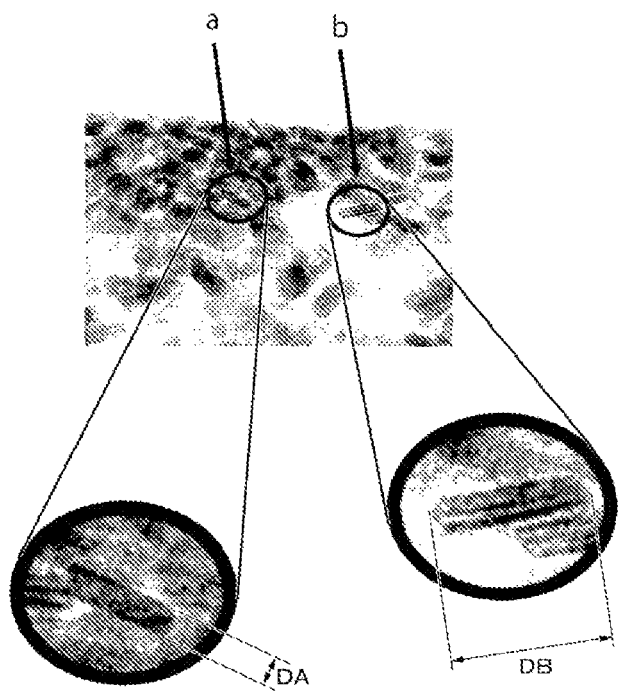
FIG. 8 is a diagram illustrating an example of a TEM photograph of a magnetic layer.
Figure 9:
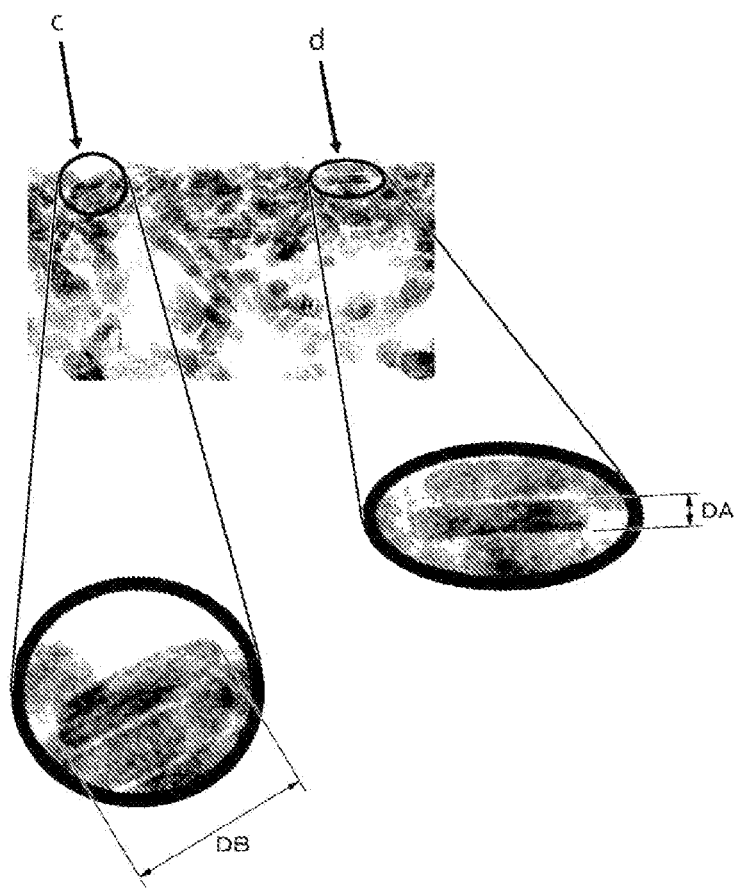
FIG. 9 is a diagram illustrating an example of a TEM photograph of a magnetic layer.

FIGS. 8 and 9 show examples of TEM photographs. In FIGS. 8 and 9, for example, particles indicated by arrows a and d are selected because the plate thicknesses (the thicknesses or heights of the particles) DA of the particles can be clearly identified. The plate thicknesses DA of the selected 50 particles are measured. An average plate thickness $DA_{ave}$ is obtained by arithmetically averaging the plate thicknesses DA obtained in this manner. The average plate thickness $DA_{ave}$ is an average particle plate thickness. Subsequently, the plate diameter DB of the magnetic powder is measured. In order to measure the plate diameter DB of the particle, 50 particles are selected from the captured TEM photographs such that the plate diameter DB of the particle can be clearly identified. In FIGS. 8 and 9, for example, particles indicated by arrows b and c are selected because the plate diameters DB of the particles can be clearly identified. The plate diameters DB of the selected 50 particles are measured. An average plate diameter $DB_{ave}$ is obtained by simply averaging (arithmetically averaging) the plate diameters DB obtained in this manner. The average plate diameter $DB_{ave}$ is an average particle size. Then, an average aspect ratio ($DB_{ave}/DA_{ave}$) of the particles is obtained from the average plate thickness $DA_{ave}$ and the average plate diameter $DB_{ave}$.

In a case where the magnetic powder contains a hexagonal ferrite particle powder, an average particle volume of the magnetic powder is preferably 500 $nm^3$ or more and 2500 $nm^3$ or less, more preferably 500 $nm^3$ or more and 1600 $nm^3$ or less, still more preferably 500 $nm^3$ or more and 1500 $nm^3$ or less, particularly preferably 600 $nm^3$ or more and 1200 $nm^3$ or less, and most preferably 600 $nm^3$ or more and 1000 $nm^3$ or less. When the average particle volume of the magnetic powder is 2500 $nm^3$ or less, the same effects as in a case where the average particle size of the magnetic powder is set to 22 nm or less are obtained. On the other hand, when the average particle volume of the magnetic powder is 500 $nm^3$ or more, the same effects as in a case where the average particle size of the magnetic powder is set to 13 nm or more are obtained.

The average particle volume of the magnetic powder is obtained as follows. First, as described with respect to the above-described method of calculating the average particle size of the magnetic powder, the average plate thickness $DA_{ave}$ and the average plate diameter $DB_{ave}$ are obtained. Next, an average volume V of the magnetic powder is obtained by the following formula.

$$V = \frac{3\sqrt{3}}{8} \times DA_{ave} \times DB_{ave} \times DB_{ave} \qquad \text{[Math. 1]}$$

(ε-Iron Oxide Particle)

The ε-iron oxide particle is a hard magnetic particle capable of obtaining a high coercive force even when it is a fine particle. Each of the ε-iron oxide particle has a spherical shape or has a cubic shape. In this specification, the spherical shape includes a substantially spherical shape. Further, the cubic shape includes a substantially cubic shape. Since the ε-iron oxide particle has the above-described shape, in a case where the ε-iron oxide particle is used as the magnetic particle, it is possible to reduce the contact area between the particles in the thickness direction of the magnetic tape MT and to curb the aggregation of the particles compared to the case where a barium ferrite particle having a hexagonal plate shape is used as the magnetic particle. Therefore, it is possible to improve the dispersibility of the magnetic powder and to obtain further excellent electromagnetic conversion characteristics (for example, SNR).

The ε-iron oxide particle has a core-shell type structure. Specifically, the ε-iron oxide particle has a core part and a shell part having a two-layer structure provided around the core part. The shell part having a two-layer structure has a first shell part provided on the core part and a second shell part provided on the first shell part.

The core part contains ε-iron oxide. The ε-iron oxide contained in the core part is preferably composed of ε-$Fe_2O_3$ crystal as a main phase and more preferably composed of single-phase ε-$Fe_2O_3$.

The first shell part covers at least a part of the periphery of the core part. Specifically, the first shell part may partially cover the periphery of the core part or may cover the entire periphery of the core part. From the viewpoint of making exchange coupling between the core part and the first shell part sufficient and improving magnetic characteristics, it is preferable to cover the entire surface of the core part.

The first shell part is a so-called soft magnetic layer and contains, for example, a soft magnetic component such as α-Fe, Ni—Fe alloys or Fe—Si—Al alloys. α-Fe may be obtained by reducing the ε-iron oxide contained in the core part.

The second shell part is an oxide film as an antioxidant layer. The second shell part contains α-iron oxide, aluminum oxide or silicon oxide. The α-iron oxide contains, for example, at least one iron oxide selected from the group consisting of $Fe_3O_4$, $Fe_2O$, and FeO. In a case where the first shell part contains α-Fe (the soft magnetic component), the α-iron oxide may be obtained by oxidizing α-Fe contained in the first shell part.

Since the ε-iron oxide particle has the first shell part as described above, a coercive force Hc of the core part alone is kept at a large value in order to secure thermal stability, and the coercive force Hc of the entire ε-iron oxide particle (a core-shell particle) can be adjusted to a coercive force Hc suitable for recording. In addition, when the ε-iron oxide particle has the second shell part as described above, in a process of producing the magnetic tape MT and before the process, it is possible to curb deterioration of the characteristics of the ε-iron oxide particle due to the ε-iron oxide particle being exposed to the air, and rust and the like being generated on the surface of the particle. Therefore, it is possible to curb deterioration of characteristics of the magnetic tape MT.

The ε-iron oxide particle may have a shell part having a single-layer structure. In this case, the shell part has the same configuration as the first shell part. Here, from the viewpoint of curbing deterioration of characteristics of the ε-iron oxide particle, as described above, it is preferable for the ε-iron oxide particle to have a shell part having a two-layer structure.

The ε-iron oxide particle may contain an additive agent in place of the core-shell structure, or may contain an additive agent together with the core-shell structure. In this case, some of Fe of the ε-iron oxide particle is replaced with an additive agent. Even when the ε-iron oxide particle contains an additive agent, since the coercive force Hc of the entire ε-iron oxide particle can be adjusted to a coercive force Hc suitable for recording, it is possible to improve ease of recording. The additive agent is a metal element other than iron, preferably a trivalent metal element, more preferably at least one selected from the group consisting of Al, Ga, and In, and still more preferably at least one selected from the group consisting of Al and Ga.

Specifically, the ε-iron oxide containing an additive agent is an ε-$Fe_{2-x}M_xO_3$ crystal (where, M is a metal element other than iron, preferably a trivalent metal element, more preferably at least one selected from the group consisting of Al, Ga, and In, and still more preferably at least one selected from the group consisting of Al and Ga. x is, for example, $0<x<1$.).

In a case where the magnetic powder contains an ε-iron oxide particle powder, the average particle size of the magnetic powder is preferably 10 nm or more and 20 nm or less, more preferably 10 nm or more and 18 nm or less, still more preferably 10 nm or more and 16 nm or less, particularly preferably 10 nm or more and 15 nm, and most preferably 10 nm or more and 14 nm or less. In the magnetic tape MT, a region having a size of ½ of the recording wavelength is the actual magnetized region. For this reason, when the average particle size of the magnetic powder is set to half or less of the shortest recording wavelength, further excellent electromagnetic conversion characteristics (for example, SNR) can be obtained. Therefore, when the average particle size of the magnetic powder is 20 nm or less, further excellent electromagnetic conversion characteristics (for example, SNR) can be obtained in the magnetic tape MT with a high recording density (for example, a magnetic tape MT configured to record a signal at the shortest recording wavelength of 40 nm or less). On the other hand, when the average particle size of the magnetic powder is 10 nm or more, the dispersibility of the magnetic powder is further improved, and further excellent electromagnetic conversion characteristics (for example, SNR) can be obtained.

In a case where the magnetic powder contains an ε-iron oxide particle powder, an average aspect ratio of the magnetic powder may be preferably 1.0 or more and 3.0 or less, more preferably 1.0 or more and 2.5 or less, still more preferably 1.0 or more and 2.1 or less, and particularly preferably 1.0 or more and 1.8 or less. When the average aspect ratio of the magnetic powder is in a range between 1.0 or more and 3.0 or less, aggregation of the magnetic powder can be curbed. In addition, when the magnetic powder is vertically oriented in the formation process of the magnetic layer 43, resistance to be applied to the magnetic powder can be curbed. Thus, a vertical orientation property of the magnetic powder can be improved.

In a case where the magnetic powder contains an ε-iron oxide particle powder, the average particle size and average aspect ratio of the magnetic powder are obtained as follows. First, the magnetic tape MT accommodated in the cartridge 10 is unwound, and the magnetic tape MT is cut out from a range of 30 m to 40 m in the longitudinal direction from the connecting portion 21 between the magnetic tape MT and the leader tape LT. Subsequently, the cut out magnetic tape MT is processed by a focused ion beam (FIB) method or the like to be sliced. In a case where the FIB method is used, a carbon layer and a tungsten layer are formed as a protective layer, which is a pretreatment for observing a cross-sectional TEM image, which will be described later. The carbon layer is formed on a surface of a side of the magnetic layer 43 and on a surface of a side of the back layer 44 of the magnetic tape MT by a vapor deposition method, and the tungsten layer is further formed on a surface of a side of the magnetic layer 43 by a vapor deposition method or a sputtering method. The slicing is performed in a length direction (the longitudinal direction) of the magnetic tape MT. That is, according to the slicing, a cross section parallel to both the longitudinal direction and the thickness direction of the magnetic tape MT is formed.

The cross section of the obtained sliced sample is observed such that the entire magnetic layer 43 is included in the thickness direction of the magnetic layer 43 with an acceleration voltage of 200 kV and a total magnification of 500,000 times using a transmission electron microscope (H-9500 manufactured by Hitachi High Technologies Co., Ltd.), and a TEM photograph is captured. Next, 50 particles whose shape can be clearly identified are selected from the captured TEM photograph, and the major axis length DL and the minor axis length DS of each particle are measured. Here, the major axis length DL means the maximum distance (a so-called maximum Feret diameter) between two parallel lines drawn from all angles to touch the outline of each particle. On the other hand, the minor axis length DS means the maximum particle length in a direction orthogonal to the major axis (DL) of the particle. Subsequently, an average major axis length $DL_{ave}$ is obtained by arithmetically averaging the major axis lengths DL of the measured 50 particles. The average major axis length $DL_{ave}$ obtained in this manner is set to be an average particle size of the magnetic powder. In addition, an average minor axis length $DS_{ave}$ is obtained by arithmetically averaging the minor axis lengths DS of the measured 50 particles. Then, an average aspect ratio ($DL_{ave}/DS_{ave}$) of a particle is obtained from the average major axis length $DL_{ave}$ and the average minor axis length $DS_{ave}$.

In a case where the magnetic powder contains an ε-iron oxide particle powder, an average particle volume of the magnetic powder is preferably 500 nm³ or more and 4000 nm³ or less, more preferably 500 nm³ or more and 3000 nm³ or less, still more preferably 500 nm³ or more and 2000 nm³ or less, particularly preferably 600 nm³ or more and 1600 nm³ or less, and most preferably 600 nm³ or more and 1300 nm³ or less. In general, since noise of the magnetic tape MT is inversely proportional to the square root of the number of particles (that is, proportional to the square root of the particle volume), it is possible to obtain further excellent electromagnetic conversion characteristics (for example, SNR) by making the particle volume smaller. Thus, when the average particle volume of the magnetic powder is 4000 nm³ or less, further excellent electromagnetic conversion characteristics (for example, SNR) can be obtained as in a case where the average particle size of the magnetic powder is set to 20 nm or less. On the other hand, when the average particle volume of the magnetic powder is 500 nm³ or more, the same effects as in a case where the average particle size of the magnetic powder is set to 10 nm or more are obtained.

In a case where the ε-iron oxide particle has a spherical shape, the average particle volume of the magnetic powder is obtained as follows. First, an average major axis length $DL_{ave}$ is obtained in the same manner as in the method of calculating the average particle size of the magnetic powder. Next, an average volume V of the magnetic powder is obtained by the following formula.

$$V=(\pi/6) \times DL_{ave}^3$$

In a case where the ε-iron oxide particle has a cubic shape, the average volume of the magnetic powder is obtained as follows. First, the magnetic tape MT accommodated in the cartridge 10 is unwound, and the magnetic tape MT is cut out from a range of 30 m to 40 m in the longitudinal direction from the connecting portion 21 between the magnetic tape MT and the leader tape LT. Subsequently, the cut out magnetic tape MT is processed by a focused ion beam (FIB) method or the like to be sliced. In a case where the FIB method is used, a carbon film and a tungsten thin film are formed as a protective film, which is a pretreatment for observing a cross-sectional TEM image, which will be described later. The carbon film is formed on a surface of a side of the magnetic layer 43 and on a surface of a side of the back layer 44 of the magnetic tape MT by a vapor deposition method, and the tungsten thin film is further formed on a surface of a side of the magnetic layer 43 by a vapor deposition method or a sputtering method. The slicing is performed in a length direction (the longitudinal direction) of the magnetic tape MT. That is, according to the slicing, a cross section parallel to both the longitudinal direction and the thickness direction of the magnetic tape MT is formed.

The cross section of the obtained sliced sample is observed such that the entire magnetic layer 43 is included in the thickness direction of the magnetic layer 43 with an acceleration voltage of 200 kV and a total magnification of 500,000 times using a transmission electron microscope (H-9500 manufactured by Hitachi High Technologies Co., Ltd.), and a TEM photograph is obtained. Here, the magnification and the acceleration voltage may be appropriately adjusted according to the type of the device. Next, 50 particles having a clear particle shape are selected from the captured TEM photograph, and a side length DC of each particle is measured. Subsequently, an average side length $DC_{ave}$ is obtained by arithmetically averaging the side lengths DC of the measured 50 particles. Next, an average volume $V_{ave}$ of the magnetic powder (a particle volume) is obtained from the following formula using the average side length $DC_{ave}$.

$$V_{ave}=DC_{ave}^3$$

(Cobalt Ferrite Particle)

The cobalt ferrite particle preferably has uniaxial crystal anisotropy. When the cobalt ferrite particle has uniaxial crystal anisotropy, the magnetic powder can be crystal-oriented preferentially in the vertical direction of the magnetic tape MT. The cobalt ferrite particle has, for example, a cubic shape. In this specification, the cubic shape includes a substantially cubic shape. The Co-containing spinel ferrite may further contain at least one selected from the group consisting of Ni, Mn, Al, Cu, and Zn other than Co.

The Co-containing spinel ferrite has, for example, an average composition represented by the following formula.

$$Co_xM_yFe_2O_z$$

(where, in the formula, M is, for example, at least one metal selected from the group consisting of Ni, Mn, Al, Cu, and Zn. x is a value in a range of 0.4≤x≤1.0. y is a value in a range of 0≤y≤0.3. Here, x and y satisfy a relationship of (x+y)≤1.0. z is a value in a range of 3≤z≤4. Some of Fe may be replaced with other metal elements)

In a case where the magnetic powder contains a cobalt ferrite particle powder, the average particle size of the magnetic powder is preferably 8 nm or more and 16 nm or less, more preferably 8 nm or more and 13 nm or less, and still more preferably 8 nm or more and 10 nm or less. When the average particle size of the magnetic powder is 16 nm or less, further excellent electromagnetic conversion characteristics (for example, SNR) can be obtained in the magnetic tape MT with a high recording density. On the other hand, when the average particle size of the magnetic powder is 8 nm or more, the dispersibility of the magnetic powder is further improved, and further excellent electromagnetic conversion characteristics (for example, SNR) can be obtained. A method of calculating the average particle size of the magnetic powder is the same as a method of calculating the average particle size of the magnetic powder in a case where the magnetic powder contains an ε-iron oxide particle powder.

In a case where the magnetic powder contains a cobalt ferrite particle powder, the average aspect ratio of the magnetic powder is preferably 1.0 or more and 2.5 or less, more preferably 1.0 or more and 2.1 or less, and still more preferably 1.0 or more and 1.8 or less. When the average aspect ratio of the magnetic powder is in a range between 1.0 or more and 2.5 or less, aggregation of the magnetic powder can be curbed. In addition, when the magnetic powder is vertically oriented in the formation process of the magnetic layer 43, resistance to be applied to the magnetic powder can be curbed. Thus, a vertical orientation property of the magnetic powder can be improved. A method of calculating the average aspect ratio of the magnetic powder is the same as a method of calculating the average aspect ratio of the magnetic powder in a case where the magnetic powder contains an ε-iron oxide particle powder.

In a case where the magnetic powder contains a cobalt ferrite particle powder, the average particle volume of the magnetic powder is preferably 500 nm³ or more and 4000 nm³ or less, more preferably 600 nm³ or more and 2000 nm³ or less, and still more preferably 600 nm³ or more and 1000 nm³ or less. When the average particle volume of the magnetic powder is 4000 nm³ or less, the same effects as in a case where the average particle size of the magnetic powder is set to 16 nm or less are obtained. On the other hand, when the average particle volume of the magnetic powder is 500 nm³ or more, the same effects as in a case where the average particle size of the magnetic powder is set to 8 nm or more are obtained. A method of calculating the average particle volume of the magnetic powder is the same as a method of calculating an average particle volume in a case where an ε-iron oxide particle has a cubic shape.

(Binding Agent)

Examples of the binding agent include thermoplastic resins, thermosetting resins, and reactive resins. Examples of thermoplastic resins include vinyl chloride, vinyl acetate, vinyl chloride-vinyl acetate copolymers, vinyl chloride-vinylidene chloride copolymers, vinyl chloride-acrylonitrile copolymers, acrylic acid ester-acrylonitrile copolymers, acrylic acid ester-vinyl chloride-vinylidene chloride copolymers, acrylic acid ester-acrylonitrile copolymers, acrylic acid ester-vinylidene chloride copolymers, methacrylic acid ester-vinylidene chloride copolymers, methacrylic acid ester-vinyl chloride copolymers, methacrylic acid ester-ethylene copolymers, polyvinyl fluoride, vinylidene chloride-acrylonitrile copolymers, acrylonitrile-butadiene copolymers, polyamide resins, polyvinyl butyral, cellulose derivatives (cellulose acetate butyrate, cellulose diacetate, cellulose triacetate, cellulose propionate, nitrocellulose), styrene butadiene copolymers, polyurethane resins, polyester resins, amino resins, and synthetic rubber.

Examples of thermosetting resins include phenolic resins, epoxy resins, polyurethane curable resins, urea resins, melamine resins, alkyd resins, silicone resins, polyamine resins, and urea formaldehyde resins.

In all of the above-described binding agent, for the purpose of improving dispersibility of the magnetic powder, polar functional groups such as —SO₃M, —OSO₃M, —COOM, P=O(OM)₂ (where, M in the formula represents a hydrogen atom or an alkali metal such as lithium, potassium, or sodium), a side-chain amine having a terminal group represented by —NR1R2, —NR1R2R3⁺X⁻, a main-chain amine represented by >NR1R2⁺X⁻ (where, R1, R2, and R3 in the formula represent a hydrogen atom or a hydrocarbon group, and X⁻ represents halogen element ions such as fluorine, chlorine, bromine, and iodine, inorganic ions, or organic ions.), and an —OH, —SH, —CN, or epoxy group may be introduced into the binding agent. The amount of these polar functional groups introduced into the binding agent is preferably $10^{-1}$ mol/g or more and $10^{-8}$ mol/g or less and more preferably $10^{-2}$ mol/g or more and $10^{-6}$ mol/g or less.

(Lubricant)

The lubricant contains, for example, at least one selected from among a fatty acid and fatty acid ester and preferably contains both the fatty acid and the fatty acid ester. When the magnetic layer 43 contains a lubricant, particularly, when the magnetic layer 43 contains both the fatty acid and the fatty acid ester, this contributes to improving the running stability of the magnetic tape MT.

The fatty acid may preferably be a compound represented by the following General Formula (1) or (2). For example, one or both of the compound represented by the following General Formula (1) and the compound represented by General Formula (2) may be contained as the fatty acid.

Moreover, the fatty acid ester may preferably be a compound represented by the following General Formula (3) or (4). For example, one or both of the compound represented by the following General Formula (3) and the compound represented by General Formula (4) may be contained as the fatty acid ester.

When the lubricant contains one or both of the compound represented by General Formula (1) and the compound represented by General Formula (2), and one or both of the compound represented by General Formula (3) and the compound represented by General Formula (4), it is possible to curb an increase in the dynamic friction coefficient due to repeated recording or reproducing of the magnetic tape MT.

$$CH_3(CH_2)_k COOH \qquad (1)$$

(where, in General Formula (1), k is an integer selected from the range of 14 or more and 22 or less and more preferably selected from the range of 14 or more and 18 or less.)

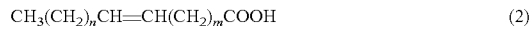

$$CH_3(CH_2)_n CH=CH(CH_2)_m COOH \qquad (2)$$

(where, in General Formula (2), a sum of n and m is an integer selected from the range of 12 or more and 20 or less and more preferably selected from the range of 14 or more and 18 or less.)

$$CH_3(CH_2)_p COO(CH_2)_q CH_3 \qquad (3)$$

(where, in General Formula (3), p is an integer selected from the range of 14 or more and 22 or less and more preferably selected from the range of 14 or more and 18 or less, and q is an integer selected from the range of 2 or more and 5 or less and more preferably selected from the range of 2 or more and 4 or less.)

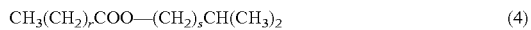

$$CH_3(CH_2)_rCOO\text{—}(CH_2)_sCH(CH_3)_2 \quad (4)$$

(where, in General Formula (4), r is an integer selected from the range of 14 or more and 22 or less, and s is an integer selected from the range of 1 or more and 3 or less.)
(Carbon)

The carbon contained in the magnetic layer 43 may function as an antistatic agent, a lubricant, and the like. Some of the carbon contained in the magnetic layer 43 is exposed from the surface of the magnetic layer 43. The unevenness on the surface of the magnetic layer 43 may be made of the carbon, the abrasive, or the like.

The carbon is specifically a carbon particle. The carbon particle includes, for example, one or more selected from the group consisting of carbon black, acetylene black, ketjen black, a carbon nanotube, and graphene.
(Antistatic Agent)

Examples of the antistatic agent include a natural surfactant, a nonionic surfactant, a cationic surfactant, and the like.
(Abrasive)

Examples of the abrasive include α-alumina with an a transformation rate of 90% or more, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, needle-shaped α-iron oxides obtained by dehydrating and annealing raw materials of magnetic iron oxide, those obtained by performing a surface treatment on the above materials with aluminum and/or silica as necessary, and the like.
(Curing Agent)

Examples of the curing agent include polyisocyanate and the like. Examples of the polyisocyanate include aromatic polyisocyanate such as an adduct of tolylene diisocyanate (TDI) and an active hydrogen compound, aliphatic polyisocyanate such as an adduct of hexamethylene diisocyanate (HMDI) and an active hydrogen compound, and the like. The weight-average molecular weight of the polyisocyanate is preferably in a range of 100 or more and 3000 or less.
(Antirust Agent)

Examples of the antirust agent include phenols, naphthols, quinones, heterocyclic compounds containing nitrogen atoms, heterocyclic compounds containing oxygen atoms, heterocyclic compounds containing sulfur atoms, and the like.
(Non-Magnetic Reinforcing Particle)

Examples of the non-magnetic reinforcing particle include aluminum oxide (α, β or γ alumina), chromium oxide, silicon oxide, diamond, garnet, emery, boron nitride, titanium carbide, silicon carbide, titanium carbide, titanium oxide (rutile type or anatase type titanium oxide), and the like.
(Underlayer)

The underlayer 42 is provided to alleviate the unevenness of the surface of the substrate 41 and adjust the unevenness of the surface of the magnetic layer 43. The underlayer 42 is a non-magnetic layer containing a non-magnetic powder, a binding agent, and a lubricant. From the underlayer 42, the lubricant is supplied to the surface of the magnetic layer 43. The underlayer 42 may further contain at least one additive agent selected from the group consisting of an antistatic agent, a curing agent, an antirust agent, and the like, as necessary.

The upper limit value of the average thickness of the underlayer 42 is preferably 1.20 μm or less, more preferably 0.90 μm or less, still more preferably 0.80 μm or less, particularly preferably 0.70 μm or less, and most preferably 0.60 μm or less. When the upper limit value of the average thickness of the underlayer 42 is 1.20 μm or less, the thickness of the magnetic tape MT can be reduced, and thus a recording capacity capable of being recorded in one data cartridge can be increased more than in a general magnetic tape. When the average thickness of the underlayer 42 is 1.20 μm or less, the degree of expansion and contraction of the magnetic tape MT due to an external force further increases, and thus it is easier to adjust the width of the magnetic tape MT by adjusting the tension. The lower limit value of the average thickness of the underlayer 42 is preferably 0.30 μm or more. When the lower limit value of the average thickness of the underlayer 42 is 0.30 μm or more, it is possible to curb a decrease in the function as the underlayer 42. Here, the average thickness of the underlayer 42 is obtained in the same manner as in the average thickness of the magnetic layer 43. Here, the magnification of the TEM image is appropriately adjusted according to the thickness of the underlayer 42.
(Non-Magnetic Powder)

The non-magnetic powder contains, for example, at least one of an inorganic particle powder and an organic particle powder. In addition, the non-magnetic powder may contain a carbon powder such as carbon black. Here, one type of non-magnetic powder may be used alone, or two or more types of non-magnetic powders may be used in combination. Examples of the inorganic particle include metals, metal oxides, metal carbonates, metal sulfates, metal nitrides, metal carbides, metal sulfides, and the like. Examples of a shape of the non-magnetic powder include various shapes such as a needle shape, a spherical shape, a cubic shape, and a plate shape, and the present disclosure is not limited to these shapes.
(Binding Agent and Lubricant)

The binding agent and the lubricant are the same as those of the above magnetic layer 43.
(Additive Agent)

The antistatic agent, the curing agent, and the antirust agent are the same as those of the above magnetic layer 43.
(Back Layer)

The back layer 44 contains a binding agent and a non-magnetic powder. The back layer 44 may further contain at least one additive agent selected from the group consisting of a lubricant, a curing agent, an antistatic agent, and the like, as necessary. The binding agent and the non-magnetic powder are the same as those of the above underlayer 42. The curing agent and the antistatic agent are the same as those of the above magnetic layer 43.

The average particle size of the non-magnetic powder is preferably 10 nm or more and 150 nm or less and more preferably 15 nm or more and 110 nm or less. The average particle size of the non-magnetic powder is obtained in the same manner as the above-described average particle size of the magnetic powder. The non-magnetic powder may contain a non-magnetic powder having a particle size distribution of 2 or more.

The upper limit value of the average thickness of the back layer 44 is preferably 0.6 μm or less and more preferably 0.3 μm or less. When the upper limit value of the average thickness of the back layer 44 is 0.6 μm or less, the thicknesses of the underlayer 42 and the substrate 41 can be kept large even when the average thickness of the magnetic tape MT is 5.3 µm or less, and thus running stability in the recording and reproducing device of the magnetic tape MT can be maintained. The lower limit value of the average thickness of the back layer 44 is not particularly limited and is, for example, 0.2 µm or more.

The average thickness $t_b$ of the back layer 44 is obtained as follows. First, the average thickness Tt of the magnetic tape MT is measured. The method of measuring the average thickness Tt is as described in the following "Average Thickness of Magnetic Tape". Subsequently, the magnetic tape MT accommodated in the cartridge 10 is unwound, and the magnetic tape MT is cut out into a length of 250 mm from each of a range of 10 m to 20 m, a range of 30 m to 40 m, and a range of 50 m to 60 m in the longitudinal direction from a connecting portion 21 between the magnetic tape MT and the leader tape LT to prepare three samples. Next, the back layer 44 of each sample is removed with a solvent such as methyl ethyl ketone (MEK) or a dilute hydrochloric acid. Next, using a laser hologauge (LGH-110C) manufactured by Mitutoyo Corporation, the thickness of each sample is measured at positions of five points, and the measured values (the thicknesses of the samples of a total of 15 points) are arithmetically averaged to calculate the average value $t_B$ [µm]. Then, the average thickness $t_b$ [µm] of the back layer 44 is obtained from the following formula. The measurement positions of five points are randomly selected from each sample such that they are different positions in the longitudinal direction of the magnetic tape MT.

$$t_b \text{ [µm]}=Tt \text{ [µm]}-t_B \text{ [µm]}$$

(Average Thickness of Magnetic Tape)

The upper limit value of the average thickness (the average total thickness) Tt of the magnetic tape MT is 5.3 µm or less, preferably 5.1 µm or less, more preferably 4.9 µm or less, particularly preferably 4.6 µm or less, and most preferably 4.4 µm or less. When the average thickness Tt of the magnetic tape MT is 5.3 µm or less, the recording capacity capable of being recorded in one data cartridge can be increased more than in a general magnetic tape. The lower limit value of the average thickness Tt of the magnetic tape MT is not particularly limited and is, for example, 3.5 µm or more.

The average thickness Tt of the magnetic tape MT is obtained as follows. First, the magnetic tape MT accommodated in the cartridge 10 is unwound, and the magnetic tape MT is cut out into a length of 250 mm from each of a range of 10 m to 20 m, a range of 30 m to 40 m, and a range of 50 m to 60 m in the longitudinal direction from a connecting portion 21 between the magnetic tape MT and the leader tape LT to prepare three samples. Next, using a laser hologauge (LGH-110C) manufactured by Mitutoyo Corporation as a measuring device, the thickness of each sample is measured at positions of five points, and the measured values (the thicknesses of the samples of a total of 15 points) are arithmetically averaged to calculate the average thickness Tt [µm]. The measurement positions of five points are randomly selected from each sample such that they are different positions in the longitudinal direction of the magnetic tape MT.

A ratio ($T_t/T_S$) of the average thickness Tt of the magnetic tape MT to the average thickness $T_S$ of the substrate 41 is preferably 1.2 or more. When the ratio ($T_t/T_S$) is 1.2 or more, the thickness of the applied layers (the magnetic layer 43, the underlayer 42, the back layer 44, and the like) with respect to the substrate 41 is sufficiently ensured, and the coated layers can promote the stabilization of contact with the head or keep a cupping within an appropriate range. As a result, it is possible to lower spacings $SR_L$ and $SR_T$ and to improve the electrical characteristics or the running stability. Here, the electrical characteristics mean electromagnetic conversion characteristics.

The methods of calculating the average thickness $T_S$ of the substrate 41 and the average thickness Tt of the magnetic tape MT are as described above.

(Arithmetic Average Roughness Ra of Surface of Magnetic Layer)

The average value of the arithmetic average roughnesses Ra of the surface of the magnetic layer 43 is 1.3 nm or less, preferably 1.2 nm or less, and more preferably 1.1 nm or less. When the average value of the arithmetic average roughnesses Ra is 1.3 nm or less, it is possible to curb the decrease in output due to the spacing loss, and thus excellent electromagnetic conversion characteristics can be obtained. The lower limit value of the average value of the arithmetic average roughnesses Ra of the surface of the magnetic layer 43 is preferably 1.0 nm or more. When the lower limit value of the average value of the arithmetic average roughnesses Ra of the surface of the magnetic layer 43 is 1.0 nm or more, it is possible to curb deterioration in running performance due to an increase in friction.

The average value of the arithmetic average roughnesses Ra is obtained as follows. First, the magnetic tape MT accommodated in the cartridge 10 is unwound, and the magnetic tape MT is cut out into a length of 250 mm from each of a range of 10 m to 20 m, a range of 30 m to 40 m, and a range of 50 m to 60 m in the longitudinal direction from a connecting portion 21 between the magnetic tape MT and the leader tape LT to prepare three samples. Next, the surface of the magnetic layer 43 of each sample is observed with an atomic force microscope (AFM) to obtain an AFM image of 40 µm×40 µm. Nano Scope IIIa D3100 manufactured by Digital Instruments Corporation is used as the AFM, a cantilever made of a silicon single crystal is used (Note 1), and a tapping frequency is tuned from 200 to 400 Hz to perform measurement. Next, each AFM image is divided into 512×512 (=262,144) measurement points, and the height Z(i) (i: measurement point number, i=1 to 262,144) at each measurement point is measured, and the average height (the average surface) Zave ((Z(1)+Z(2)+ . . . +Z(262,144))/262,144) is obtained by arithmetically averaging the heights Z(i) of the measurement points. Subsequently, the deviation from the average center line at each measurement point Z"(i) (=Z(i)−Zave) is obtained, and the arithmetic average roughness Ra [nm] (=(Z"(1)+Z"(2)+ . . . +Z"(262,144))/262,144) is calculated. In this case, data subjected to filtering processing by Flatten order 2 and planefit order 3 XY as image processing is used.

(Note 1) manufactured by Nano World AG, SPM probe NCH normal type PointProbe L (cantilever length)=125 µm The average value of the arithmetic average roughnesses Ra is calculated by arithmetically averaging the arithmetic average roughnesses Ra of the three samples.

(Surface Roughness Rb of Back Surface)

It is preferable that the average value of a surface roughnesses of a back surface (a surface roughness of the back layer 44) $R_b$ be $R_b \leq 6.0$ [nm]. When the average value of the surface roughnesses $R_b$ of the back surface is in the above-described range, more excellent electromagnetic conversion characteristics can be obtained.

The average value of the surface roughnesses $R_b$ of the back surface is obtained as follows. First, the magnetic tape MT accommodated in the cartridge 10 is unwound, and the magnetic tape MT is cut out into a length of 100 mm from each of a range of 10 m to 20 m, a range of 30 m to 40 m, and a range of 50 m to 60 m in the longitudinal direction from a connecting portion 21 between the magnetic tape MT and the leader tape LT to prepare three samples. Next, the sample is placed on a slide glass such that a surface to be measured (a surface on a side of the magnetic layer) of the sample faces upward, and the end portions of the sample are fixed with mending tape. A surface shape is measured using a VertScan (a 20 times objective lens) as a measuring device, and a surface roughness $R_b$ of the back surface is obtained from the following formula on the basis of the ISO 25178 standard.

Measurement conditions are as follows.
Device: Non-contact roughness meter using optical interference (Non-contact surface and layer cross-sectional shape measurement system VertScan R5500GL-M100-AC manufactured by Ryoka System Co., Ltd.)
Objective lens: 20 times
Measurement region: 640×480 pixels (field of view: approximately 237 µm×178 µm field of view)
Measurement mode: Phase
Wavelength filter: 520 nm
CCD: ⅓ inch
Noise removal filter: Smoothing 3×3
Surface correction: Correction with quadratic polynomial approximation surface
Measurement software: VS-Measure Version 5.5.2 Analysis software: VS-viewer Version 5.5.5

$$S_a = \frac{1}{A}\int\int_A |Z(x, y)| dx dy \quad \text{[Math. 2]}$$

For each sample, as described above, after a surface roughness is measured at positions of five points of the magnetic tape MT in the longitudinal direction, the average value of the arithmetic average roughnesses $S_a$ (nm) automatically calculated from a surface profile obtained at each position is set to be a surface roughness $R_b$ (nm) of the back surface. The measurement positions of five points are randomly selected from each sample such that they are different positions in the longitudinal direction of the magnetic tape MT. Next, the average value of the surface roughnesses $R_b$ is calculated by arithmetically averaging the surface roughnesses $R_b$ obtained from the three samples.

(Average Value of Coercive Forces Hc2)

The upper limit value of the average value of coercive forces Hc2 of the magnetic layer 43 in the longitudinal direction of the magnetic tape MT is preferably 3000 Oe or less, more preferably 2000 Oe or less, still more preferably 1900 Oe or less, and particularly preferably 1800 Oe or less. When the average value of the coercive forces Hc2 of the magnetic layer 43 in the longitudinal direction of the magnetic tape MT is 3000 Oe or less, sufficient electromagnetic conversion characteristics can be provided even at a high recording density.

The lower limit value of the average value of the coercive forces Hc2 of the magnetic layer 43 measured in the longitudinal direction of the magnetic tape MT is preferably 1000 Oe or more. When the average value of the coercive forces Hc2 of the magnetic layer 43 measured in the longitudinal direction of the magnetic tape MT is 1000 Oe or more, demagnetization due to leakage flux from the recording head can be curbed.

The above average value of the coercive forces Hc2 is obtained as follows. First, the magnetic tape MT accommodated in the cartridge 10 is unwound, and the magnetic tape MT is cut out into a length of 250 mm from each of a range of 10 m to 20 m, a range of 30 m to 40 m, and a range of 50 m to 60 m in the longitudinal direction from a connecting portion 21 between the magnetic tape MT and the leader tape LT. The coercive force Hc2 of each cut out magnetic tape MT is measured as follows. Three sheets of the magnetic tape MT are superimposed with double-sided tape such that the directions in the longitudinal direction are the same, and then punched out with a punch of φ6.39 mm to prepare a measurement sample. At this time, marking is performed with any non-magnetic ink such that the longitudinal direction (the running direction) of the magnetic tape MT can be recognized. Then, the M-H loop of the measurement sample (the entire magnetic tape MT) corresponding to the longitudinal direction (the running direction) of the magnetic tape MT is measured using a vibrating sample magnetometer (VSM). Next, the coating films (the underlayer 42, the magnetic layer 43, the back layer 44, and the like) of the magnetic tape MT cut out above are wiped off with acetone, ethanol, or the like, leaving only the substrate 41. Three substrates 41 thus obtained are superimposed with double-sided tape, and then punched out with a punch of W 6.39 mm to prepare a sample for background correction (hereinafter simply referred to as a "sample for correction"). After that, the VSM is used to measure the M-H loop of the sample for correction (the substrate 41) corresponding to the longitudinal direction of the substrate 41 (the longitudinal direction of the magnetic tape MT).

A high sensitivity vibrating sample magnetometer "Type VSM-P7-15" (commercially available from Toei Industry Co., Ltd.) is used for measuring the M-H loop of the measurement sample (the entire magnetic tape MT) and the M-H loop of the sample for correction (the substrate 41). Measurement conditions are measurement mode: full loop, maximum magnetic field: 15 kOe, magnetic field step: 40 bits, time constant of locking amp: 0.3 sec, waiting time: 1 sec, MH average number: 20.

After the M-H loop of the measurement sample (the entire magnetic tape MT) and the M-H loop of the sample for correction (the substrate 41) are obtained, the M-H loop of the sample for correction (the substrate 41) is subtracted from the M-H loop of the measurement sample (the entire magnetic tape MT) to perform background correction, and the M-H loop after background correction is obtained. A measurement and analysis program bundled in "Type VSM-P7-15" is used for calculating this background correction. The coercive force Hc2 is obtained from the obtained M-H loop after background correction. Here, for this calculation, a measurement and analysis program bundled in "Type VSM-P7-15" is used. In addition, it is assumed that all of the above-described M-H loop measurements are performed in an environment of 25° C.±2° C. and 50% RH±5% RH. In addition, "diamagnetic field correction" when the M-H loop is measured in the longitudinal direction of the magnetic tape MT is not performed. Next, the average value of the coercive forces Hc2 is calculated by arithmetically averaging the coercive forces Hc2 of the three samples obtained as described above.

(Average Value of Squareness Ratios S1 and S2)

The average value of the squareness ratios S1 of the magnetic layer 43 in the vertical direction of the magnetic tape MT is preferably 65% or more, more preferably 70% or more, still more preferably 75% or more, particularly preferably 80% or more, and most preferably 85% or more.

When the average value of the squareness ratios S1 is 65% or more, since the vertical orientation property of the magnetic powder is sufficiently improved, it is possible to obtain better electromagnetic conversion characteristics.

The average value of the squareness ratios S1 in the vertical direction of the magnetic tape MT is obtained as follows. First, the magnetic tape MT accommodated in the cartridge 10 is unwound, and the magnetic tape MT is cut out into a length of 250 mm from each of a range of 10 m to 20 m, a range of 30 m to 40 m, and a range of 50 m to 60 m in the longitudinal direction from a connecting portion 21 between the magnetic tape MT and the leader tape LT. The squareness ratio S1 of each cut out magnetic tape MT is measured as follows. Three sheets of the magnetic tape MT are superimposed with double-sided tape such that the directions in the longitudinal direction are the same, and then punched out with a punch of φ6.39 mm to prepare a measurement sample. At this time, marking is performed with any non-magnetic ink such that the longitudinal direction (the running direction) of the magnetic tape MT can be recognized. Then, the M-H loop of the measurement sample (the entire magnetic tape MT) corresponding to the vertical direction of the magnetic tape MT (the thickness direction of the magnetic tape MT) is measured using a vibrating sample magnetometer (VSM). Next, the coating films (the underlayer 42, the magnetic layer 43, the back layer 44, and the like) of the magnetic tape MT cut out above are wiped off with acetone, ethanol, or the like, leaving only the substrate 41. Three substrates 41 thus obtained are superimposed with double-sided tape, and then punched out with a punch of φ6.39 mm to prepare a sample for background correction (hereinafter simply referred to as a "sample for correction"). After that, the VSM is used to measure the M-H loop of the sample for correction (the substrate 41) corresponding to the vertical direction of the substrate 41 (the vertical direction of the magnetic tape MT).

A high sensitivity vibrating sample magnetometer "Type VSM-P7-15" (commercially available from Toei Industry Co., Ltd.) is used for measuring the M-H loop of the measurement sample (the entire magnetic tape MT) and the M-H loop of the sample for correction (the substrate 41). Measurement conditions are measurement mode: full loop, maximum magnetic field: 15 kOe, magnetic field step: 40 bits, time constant of locking amp: 0.3 sec, waiting time: 1 sec, MH average number: 20.

After the M-H loop of the measurement sample (the entire magnetic tape MT) and the M-H loop of the sample for correction (the substrate 41) are obtained, the M-H loop of the sample for correction (the substrate 41) is subtracted from the M-H loop of the measurement sample (the entire magnetic tape MT) to perform background correction, and the M-H loop after background correction is obtained. A measurement and analysis program bundled in "Type VSM-P7-15" is used for calculating this background correction.

A saturation magnetization Ms (emu) and a residual magnetization Mr (emu) of the obtained M-H loop after background correction are substituted into the following formula, and the squareness ratio S1 (%) is calculated. In addition, it is assumed that all of the above-described M-H loop measurements are performed in an environment of 25° C. 2° C. and 50% RH±5% RH. In addition, "diamagnetic field correction" when the M-H loop is measured in the vertical direction of the magnetic tape MT is not performed. Here, for this calculation, a measurement and analysis program bundled in "Type VSM-P7-15" is used.

squareness ratio $S1$ (%)=$(Mr/Ms) \times 100$

Next, the average value of the squareness ratios S1 is calculated by arithmetically averaging the squareness ratios S1 of the three samples obtained as described above.

The average value of the squareness ratios S2 of the magnetic layer 43 in the longitudinal direction (the running direction) of the magnetic tape MT is preferably 35% or less, more preferably 30% or less, still more preferably 25% or less, particularly preferably 20% or less, and most preferably 15% or less. When the average value of the squareness ratios S2 is 35% or less, since the vertical orientation property of the magnetic powder is sufficiently improved, it is possible to obtain better electromagnetic conversion characteristics.

The average value of the squareness ratios S2 in the longitudinal direction of the magnetic tape MT is obtained in the same manner as the average value of the squareness ratios S1 except that the M-H loop is measured in the longitudinal direction (the running direction) of the magnetic tape MT and the substrate 41.

(Average Young's Modulus of Magnetic Tape in Longitudinal Direction)

The upper limit value of an average Young's modulus of the magnetic tape MT in the longitudinal direction is preferably 9.0 GPa or less, more preferably 8.0 GPa or less, still more preferably 7.5 GPa or less, and particularly preferably 7.1 GPa or less. When the average Young's modulus of the magnetic tape MT in the longitudinal direction is 9.0 GPa or less, the degree of expansion and contraction of the magnetic tape MT due to an external force further increases, and thus it is easier to adjust the width of the magnetic tape MT by adjusting the tension. Therefore, it is possible to more appropriately curb off-track errors, and it is possible to more accurately reproduce data recorded in the magnetic tape MT. The lower limit value of the average Young's modulus of the magnetic tape MT in the longitudinal direction is preferably 3.0 GPa or more and more preferably 4.0 GPa or more. When the lower limit value of the average Young's modulus of the magnetic tape MT in the longitudinal direction is 3.0 GPa or more, it is possible to curb deterioration in running stability.

The average Young's modulus of the magnetic tape MT in the longitudinal direction is a value indicating a lower likelihood of expansion and contraction in the longitudinal direction of the magnetic tape MT due to an external force, and when this value is larger, the magnetic tape MT is less likely to expand and contract in the longitudinal direction due to an external force, and when this value is smaller, the magnetic tape MT is more likely to expand and contract in the longitudinal direction due to an external force.

Here, the average Young's modulus of the magnetic tape MT in the longitudinal direction is a value related to the magnetic tape MT in the longitudinal direction, but it also correlates with a lower likelihood of expansion and contraction of the magnetic tape MT in the width direction. That is, when this value is larger, the magnetic tape MT is less likely to expand and contract in the width direction due to an external force, and when this value is smaller, the magnetic tape MT is more likely to expand and contract in the width direction due to an external force. Therefore, from the viewpoint of tension adjustment, it is advantageous that the average Young's modulus of the magnetic tape MT in the longitudinal direction is as small as described above, 9.0 GPa or less.

A tensile strength tester (AG-100D manufactured by Shimadzu Corporation) is used to measure the Young's modulus. The average Young's modulus of the tape in the longitudinal direction is obtained as follows. The magnetic tape MT accommodated in the cartridge 10 is unwound, and the magnetic tape MT is cut out into a length of 180 mm from each of a range of 10 m to 20 m, a range of 30 m to 40 m, and a range of 50 m to 60 m in the longitudinal direction from a connecting portion 21 between the magnetic tape MT and the leader tape LT to prepare three measurement samples. The following measurements are performed on the prepared three measurement samples. A jig capable of fixing the width (½ inch) of the tape is attached to the tensile strength tester, and the top and bottom of the tape width are fixed. The distance (the length of the tape between chucks) is set to 100 mm. After chucking the tape sample, a stress is gradually applied in the direction of pulling the sample (the longitudinal direction of the sample). A tensile speed is set to 0.1 mm/min. The Young's modulus is calculated using the following formula from the change in the stress and the amount of elongation in this case.

$$E\ (N/m^2) = ((\Delta N/S)/(\Delta x/L)) \times 10^6$$

ΔN: Change in stress (N)
S: Cross-sectional area of test piece (mm²)
Δx: Amount of elongation (mm)
L: Distance between gripping jigs (mm)

The cross-sectional area S of the measurement sample is the cross-sectional area before the tensile operation and is obtained by multiplying the width (½ inch) of the measurement sample by the thickness of the measurement sample. As for the range of the tensile stress for measurement, the range of the tensile stress in the linear region is set according to the thickness of the magnetic tape MT. Here, the stress range is from 0.5 N to 1.0 N, and the change in the stress (ΔN) and the amount of elongation (Δx) at this time are used for calculation. In addition, the measurement of the above-described Young's modulus is performed in an environment of 25° C. f 2° C. and 50% RH±5% RH.

Next, the average Young's modulus of the magnetic tape MT in the longitudinal direction is calculated by arithmetically averaging the Young's moduli in the longitudinal direction measured using the three samples.

(Average Young's modulus of Substrate in Longitudinal Direction)

The average Young's modulus of the substrate 41 in the longitudinal direction is preferably 7.8 GPa or less, more preferably 7.0 GPa or less, still more preferably 6.6 GPa or less, and particularly preferably 6.4 GPa or less. When the average Young's modulus of the substrate 41 in the longitudinal direction is 7.8 Gpa or less, the degree of expansion and contraction of the magnetic tape MT due to an external force further increases, and thus it is easier to adjust the width of the magnetic tape MT by adjusting the tension. Therefore, it is possible to more appropriately curb off-track errors, and it is possible to more accurately reproduce data recorded in the magnetic tape MT. The lower limit value of the average Young's modulus of the substrate 41 in the longitudinal direction is preferably 2.5 GPa or more and more preferably 3.0 GPa or more. When the lower limit value of the average Young's modulus of the substrate 41 in the longitudinal direction is 2.5 GPa or more, it is possible to curb deterioration in running stability.

The average Young's modulus of the substrate 41 in the longitudinal direction is obtained as follows. First, the magnetic tape MT accommodated in the cartridge 10 is unwound, and the magnetic tape MT is cut out into a length of 180 mm from each of a range of 10 m to 20 m, a range of 30 m to 40 m, and a range of 50 m to 60 m in the longitudinal direction from a connecting portion 21 between the magnetic tape MT and the leader tape LT to prepare three samples. Subsequently, the underlayer 42, the magnetic layer 43, and the back layer 44 are removed from each cut out sample to obtain the substrate 41. The Young's modulus of the substrate 41 in the longitudinal direction is obtained using the substrate 41 in the same procedure as in the above Young's modulus of the magnetic tape MT in the longitudinal direction. Next, the average Young's modulus of the substrate 41 in the longitudinal direction is calculated by arithmetically averaging the Young's moduli in the longitudinal direction measured using the three substrates 41.

The thickness of the substrate 41 occupies half or more of the total thickness of the magnetic tape MT. Therefore, the average Young's modulus of the substrate 41 in the longitudinal direction correlates with a lower likelihood of expansion and contraction of the magnetic tape MT due to an external force, and when this value is larger, the magnetic tape MT is less likely to expand and contract in the width direction due to an external force, and when this value is smaller, the magnetic tape MT is more likely to expand and contract in the width direction due to an external force.

Here, the average Young's modulus of the substrate 41 in the longitudinal direction is a value related to the magnetic tape MT in the longitudinal direction, but it also correlates with a lower likelihood of expansion and contraction of the magnetic tape MT in the width direction. That is, when this value is larger, the magnetic tape MT is less likely to expand and contract in the width direction due to an external force, and when this value is smaller, the magnetic tape MT is more likely to expand and contract in the width direction due to an external force. Therefore, from the viewpoint of tension adjustment, it is advantageous that the average Young's modulus of the substrate 41 in the longitudinal direction is as small as described above, 7.8 GPa or less.

(Spacing Index SRL)

The upper limit value of a spacing index SRL when sliding on the glass pseudo head is 35 μm or less, preferably 33 μm or less, and more preferably 31 μm or less. When the spacing index SRL exceeds 35 μm, the electromagnetic conversion characteristics are degraded due to the effects of a spacing increase region $R_L$.

The spacing index SRL represents a tape floating state on a head entrance side when the magnetic tape MT enters the glass pseudo head. Specifically, the spacing index SRL is an average value of peak half widths of the spacing increase region $R_L$ generated on the entrance side of the glass pseudo head which the magnetic tape MT enters when the magnetic tape MT is slid over the glass pseudo head. Here, the spacing increase region $R_L$ refers to a region in which a spacing increases compared to the central portion of the sliding surface of the magnetic head 56 in a width direction on the head entrance side when the magnetic tape MT enters the magnetic head 56 or the glass pseudo head. The spacing refers to the distance between the running magnetic tape MT and the magnetic head 56 or glass pseudo head.

The lower limit value of the spacing index SRL when sliding on the glass pseudo head is, for example, 0 μm or more.

As shown in FIG. 4, the recording and reproducing element is provided at the central portion of the sliding surface of the magnetic head 56 in the width direction, and the width direction of the sliding surface coincides with the longitudinal direction of the magnetic tape MT, that is, the running direction of the magnetic tape MT. The spacing increase region $R_L$ is generated on the head entrance side when the magnetic tape MT enters the magnetic head 56. If the spacing increase region $R_L$ is widened, the spacing increase region $R_L$ reaches a portion of the recording and reproducing element, which leads to deterioration of the electromagnetic conversion characteristics.

In the recording and reproducing devices of the future, further reduction in friction will be required in order to perform recording and reproducing at a higher density, and it is conceivable that the width of the magnetic head 56 in the longitudinal direction of the magnetic tape MT will be further narrowed. Therefore, it is desirable that the distance from the edge of the magnetic head 56 to the central recording and reproducing element in the longitudinal direction of the magnetic tape MT be shortened, and that the spacing increase region $R_L$ be further narrowed.

It is possible to narrow the spacing increase region $R_L$, that is, to decrease the spacing index SRL, by, for example, adjusting the thickness configuration of the magnetic tape MT including the material type and thickness of the substrate 41 and the thickness of the underlayer 42 and adjusting the calendering conditions, thereby reducing the stiffness of the magnetic tape MT within a specified range. As a result, it is conceivable that the magnetic tape MT floating from the sliding surface of the magnetic head 56 in the vicinity of the head on the entrance side does not continue to float due to its rigidity, and the magnetic tape MT approaches the sliding surface of the magnetic head 56 again.

In addition, it is also possible to narrow the spacing increase region $R_L$, that is, to decrease the spacing index SRL, by adjusting the thickness configuration of the magnetic tape MT including the material type and thickness of the substrate 41, the thickness of the underlayer 42, and the thickness of the back layer 44, thereby keeping the cupping of the magnetic tape MT within a specified range. It is conceivable that floating in the vicinity of the head on the entrance side is curbed because the magnetic surface of the magnetic tape MT has a cupping that does not become too concave.

(Spacing Index SRT)

The upper limit value of a spacing index SRT when sliding on the glass pseudo head is 68 μm or less, preferably 66 μm or less, and more preferably 64 μm or less. When the spacing index SRT exceeds 68 μm, the running stability is degraded due to the effects of a spacing increase region RT.

The spacing index SRT represents a tape floating state in the vicinity of an edge of the magnetic tape MT in the width direction. Specifically, the spacing index SRT is an average value of peak half widths of the spacing increase region RT generated in the vicinity of the edge of the magnetic tape MT in the width direction when the magnetic tape MT is slid over the glass pseudo head. Here, the spacing increase region $R_T$ refers to a region in which a spacing increases compared to the central portion of the sliding surface of the magnetic head 56 in a width direction in the vicinity of the edge of the magnetic tape MT in the width direction.

The lower limit value of the spacing index SRT when sliding on the glass pseudo head is, for example, 0 μm or more.

A recording region of a servo signal (a servo band SB) for controlling the running of the magnetic tape MT exists in the vicinity of the edge of the magnetic tape MT in the width direction. If the spacing increase region RT is widened, the spacing increase region RT approaches the recording region of a servo signal, which is a factor in lowering the reading accuracy of the servo signal. In the magnetic recording and reproducing devices of the future, higher precision servo signal reading capability will be required in order to perform recording and reproducing at a higher density.

On the other hand, in order to perform recording and reproducing at a high density, it is necessary to smooth the surface of the magnetic tape MT and reduce the thickness of the magnetic tape MT, which all leads to deterioration of the reading accuracy of the servo signal. Therefore, in the future, it is necessary to reduce the influence of the floating state in the vicinity the edge of the magnetic tape MT in the width direction on the reading accuracy of the servo signal more than at present, and thus it is desirable to narrow the spacing increase region RT.

It is possible to narrow the spacing increase region RT, that is, to decrease the spacing index SRT, by, for example, adjusting the thickness configuration of the magnetic tape MT including the material type and thickness of the substrate 41 and the thickness of the underlayer 42 and adjusting the calendering conditions, thereby reducing the stiffness of the magnetic tape MT within a specified range. As a result, the magnetic tape MT floating in the vicinity of the edge of the magnetic tape MT in the width direction can easily follow the head even in the vicinity of the edge of the magnetic tape MT due to its low rigidity.

In addition, it is also possible to narrow the spacing increase region RT, that is, to decrease the spacing index SRT, by, for example, adjusting the thickness configuration of the magnetic tape MT including the material type and thickness of the substrate 41, the thickness of the underlayer 42, and the thickness of the back layer and adjusting the drying temperature, thereby keeping the cupping of the magnetic tape MT within a specified range. It is conceivable that following to the magnetic head 56 becomes easy even in the vicinity of the edge of the magnetic tape MT in the width direction because the magnetic surface of the magnetic tape MT has a cupping that is neither too concave nor too convex.

(Method of Calculating Spacing Indexes SRL and SRT)

A method of calculating the spacing indexes SRL and SRT will be described below.

First, referring to FIG. 10, a measuring device 80 for obtaining a 2D profile will be described. The 2D profile is used in the process of calculating the spacing index SRL and the spacing index SRT, as will be described later.

The measuring device 80 can measure the distance (the spacing) between a sliding surface 70S of a dummy 70 and the running magnetic tape MT as a 2D profile. The measuring device 80 includes a light source 81, a beam splitter 82, an imaging unit 83, an amplification unit 84, a control device 85, a display unit 86, and an input unit 87. In the following description, samples cut out from the magnetic tape MT may be referred to as a tape sample MT1 or a test sample MT2.

An orthogonal coordinate system based on the rectangular parallelepiped dummy 70 is represented by an XYZ coordinate system. In the dummy 70, a length direction (a Y-axis direction) corresponds to the width direction of the magnetic tape MT, and a width direction (an X-axis direction) corresponds to the longitudinal direction (the length direction) of the magnetic tape MT and the running direction of the magnetic tape MT. Further, in the dummy 70, a height direction (a Z-axis direction) corresponds to the thickness direction of the magnetic tape MT.

The dummy 70 is a glass pseudo head. Detailed information about the dummy 70 is as follows.

Material: BK7 glass

Shape: Rectangular parallelepiped (width 1 mm×length 20 mm×depth 3 mm)

Processing: Each ridge is to be a sharp edge.

Degree of parallelization is to be within 10 minutes.

A roughness of the sliding surface 70S (the tape contact surface) and its opposing surface is Ra≤0.2 nm.

A side surface (width 1 mm×length 20 mm) on a long side of the dummy 70 is used as the sliding surface 70S. The reason why a glass material is used as a material of the dummy 70 is that the state of contact between the sliding surface 70S and the magnetic tape MT is evaluated with the interference fringes of light.

The light source 81 is configured to emit monochromatic light in a specific wavelength region (for example, red). The beam splitter 82 transmits the light emitted from the light source 81 and guides the reflected light reflected by the dummy 70 and the magnetic tape MT to a side of the imaging unit 83.

The imaging unit 83 captures an image of the dummy 70 and the magnetic tape MT with the reflected light. The amplification unit 84 amplifies a signal of the image captured by the imaging unit 83 and outputs the amplified signal to the control device 85. The control device 85 includes, for example, a control unit, a storage unit, a communication unit, and the like. The control unit is constituted by, for example, a central processing unit (CPU) and the like and comprehensively controls each unit of the measuring device 80 according to a program stored in the storage unit.

The storage unit includes a nonvolatile memory in which various data and various programs are recorded and a volatile memory used as a work region for the control unit. The various programs described above may be read from a portable recording medium such as an optical disc or a semiconductor memory, or may be downloaded from a server device on a network. The communication unit is configured to be able to communicate with another device such as a server device, for example.

The display unit 86 is constituted by, for example, a liquid crystal display or an electro-luminescence (EL) display and the like and displays the image captured by the imaging unit 83 on the display unit (the display) 86 according to an instruction from the control device 85. The input unit 87 is, for example, a keyboard, a contact sensor, or the like and inputs various instructions from the user and outputs them to the control device 85.

Here, the movement of light will be described. First, the light emitted from the light source 81 passes through the beam splitter 82 and enters the dummy 70 from a back side of the dummy 70 (a side opposite to the sliding surface 70S). Some of the light that has entered the dummy 70 is reflected by the sliding surface 70S. In addition, another some of the light that has entered the dummy 70 is transmitted through the sliding surface 70S and reflected by the magnetic tape MT. The light reflected by the sliding surface 70S and the magnetic tape MT is guided by the beam splitter 82 to a side of the imaging unit 83, and an image is captured by the imaging unit 83.

If there is a distance between the sliding surface 70S and the magnetic tape MT, the reflected light reflected by the sliding surface 70S and the reflected light reflected by the magnetic tape MT are strengthened or weakened according to the distance. This will appear as interference fringes in the image captured by the imaging unit 83.

Figure 11:
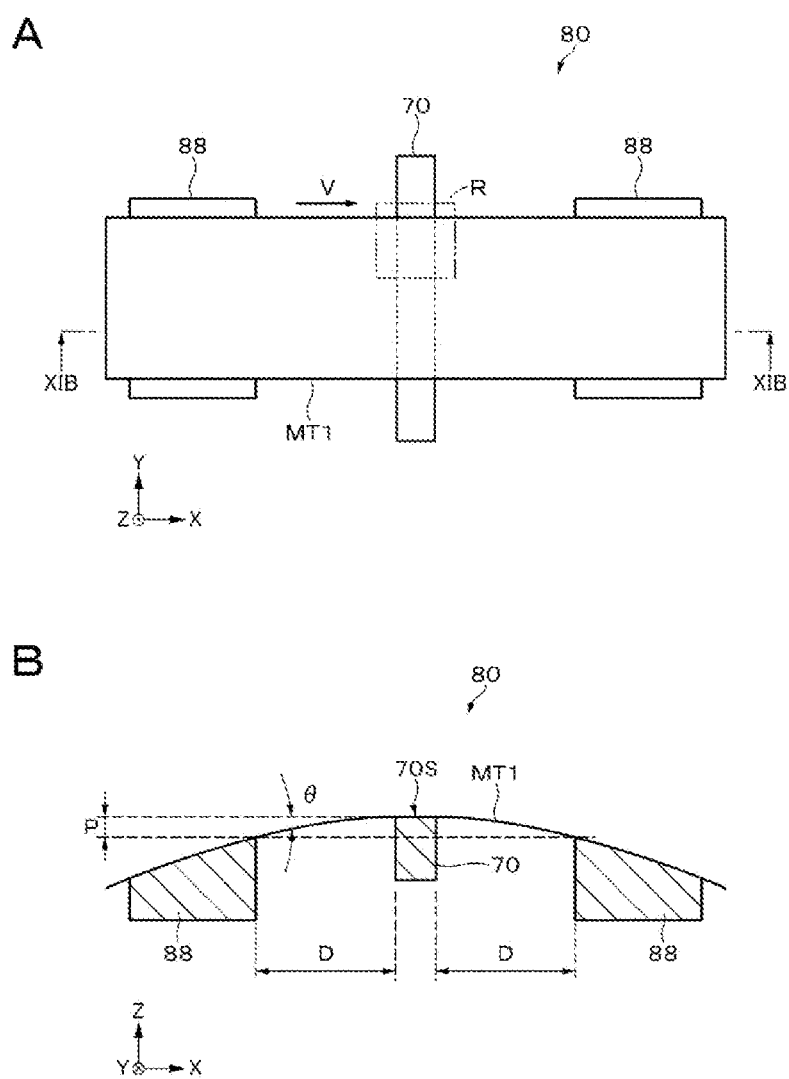
FIG. 11A is an enlarged view illustrating a relationship between a dummy and a magnetic tape in the measuring device.
FIG. 11B is a cross-sectional view along line XIB-XIB of FIG. 11A.

FIG. 11A is an enlarged view illustrating a relationship between the dummy 70 and the magnetic tape MT in the measuring device 80. FIG. 11B is a cross-sectional view along line XIB-XIB of FIG. 11A. FIG. 12 is a diagram illustrating an example of the 2D profile acquired by the measuring device 80. The measurement position of the 2D profile shown in FIG. 12 is a region R in FIG. 11A.

Figure 10:
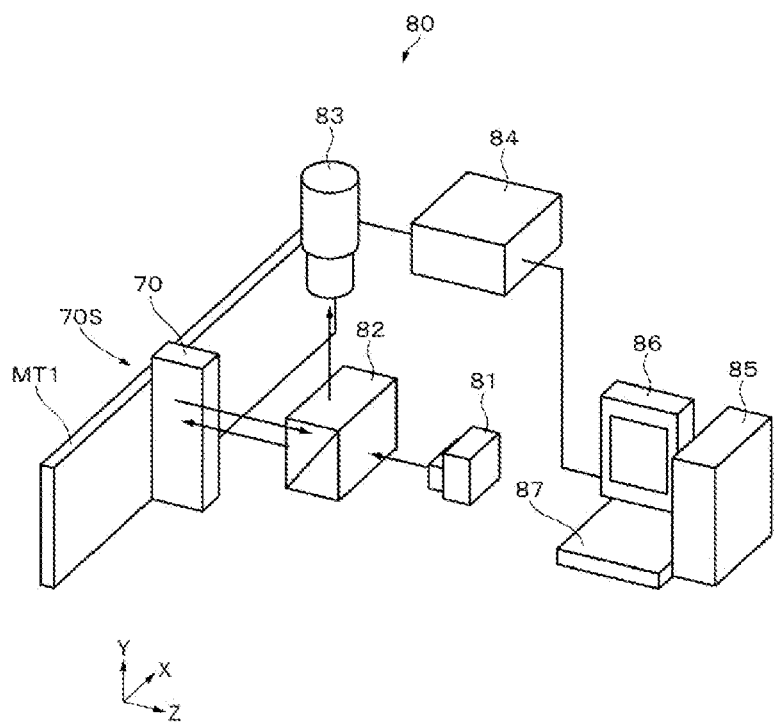
FIG. 10 is a schematic view illustrating a configuration of a measuring device.

As shown in FIGS. 11A and 11B, the measuring device 80 includes a guide 88 for guiding the magnetic tape MT in addition to the units shown in FIG. 10. Although not shown, the measuring device 80 also includes a driving device for running the magnetic tape MT, a dummy moving mechanism for moving the dummy 70 toward the magnetic tape MT, and the like.

The two guides 88 are disposed with a predetermined distance from the dummy 70 at positions between which the dummy 70 is sandwiched in the width direction of the dummy 70 (the X-axis direction: the running direction of the magnetic tape MT). The dummy 70 is installed in the measuring device 80 such that a line connecting the same positions of the two guides 88 (a dotted line in FIG. 11B) and the surface of the dummy 70 (a dotted line in FIG. 11B) are parallel to each other. In addition, the distances D between the dummy 70 and the two guides 88 are set to be the same. In this measurement, the distances D are set to 19.5 mm.

Air guides are used in this measurement as the two guides 88 for guiding the magnetic tape MT. That is, a certain amount of air released from holes in the surface of the guide 88 stays between the magnetic tape MT and the guide 88, which hinders direct contact between the magnetic tape MT and the guide 88, and as a result, friction between the two can be significantly reduced. The reason why the air guide is used as the guide 88 in this measurement is to obtain this low friction, and this enables more accurate spacing evaluation. In addition, the two guides 88 on both sides of the dummy 70 are equipped with air pressure measuring devices, and the tape tension can be measured using the measured values thereof. The measuring device 80 automatically controls the air pressure such that the tension value (0.6 N) used in this measurement, which will be described later, is obtained. In addition, calibration is to be performed before measurement such that the relationship between the tension value and the air pressure is accurate.

The dummy 70 can be moved in the thickness direction (the Z-axis direction) of the dummy 70 by a dummy moving mechanism and can be protruded toward the magnetic tape MT. The distance by which the dummy 70 protrudes toward the magnetic tape MT and intrudes the magnetic tape MT is hereinafter referred to as an intrusion distance P. The intrusion distance P is based on the position of the dummy 70 when the magnetic tape MT is flattened and the dummy 70 is in contact with the flat magnetic tape MT (the intrusion distance P=0).

Further, an angle formed between the sliding surface 70S of the dummy 70 and the magnetic tape MT when viewed in the length direction of the dummy 70 (the Y-axis direction: the width direction of the magnetic tape MT) is hereinafter referred to as a wrap angle θ (not the portion of the magnetic tape MT facing the sliding surface 70S, but the portions on both sides between which the portion facing the sliding surface 70S is sandwiched in the running direction of the magnetic tape MT). In this measurement, an entering distance P has been adjusted such that the wrap angle θ is 5°. Further, in this measurement, a speed V for running the magnetic tape MT is set to 5 m/s. The reason why the wrap angle θ is set to 5° and the speed V is set to 5 m/s in this measurement is to reduce variations in measured values.

The spacing indexes SRL and SRT are obtained as follows using the measuring device 80 described above.

First, the magnetic tape MT accommodated in the cartridge 10 is unwound, and the magnetic tape MT is cut out from each of a range of 10 m to 210 m, a range of 350 m to 550 m, and a range of 700 m to 900 m in the longitudinal direction from a connecting portion 21 between the magnetic tape MT and the leader tape LT to prepare three tape samples MT1 each having a length of 200 m.

Next, the spacing index srl and the spacing index srt are obtained from the three tape samples MT1 as follows. First, the tape sample MT1 is installed in the driving device of the measuring device 80 of FIG. 10. As a driving device, Tape Transport System manufactured by Mountain Engendering is used.

The measurement conditions of the measuring device 80 are as follows.

Light source: MORITEX red LED (wavelength 620 nm).
CCD camera: Sony XC-75, horizontal resolution=L: 640 pix×T: 480 pix, vertical resolution 256 (8 bits)
Objective lens: TV-Z-H (magnification 4 times)

The dummy (the glass pseudo head) 70 is pushed toward the tape sample MT1, and the wrap angle is set to 5°.

Measurement environment: 23° C.±2° C., 40% RH or more and 60% RH or less

The tape sample MT1 is run at a speed of 5 m/s. At that time, the tension of the tape sample MT1 is set to 0.6 N.

Next, the tape sample MT1 is run by the driving device, the spacing state of the tape sample MT1 is observed at three positions by the measuring device 80, and the 2D profiles P1 (L, T) to P3 (L, T) are acquired (see FIG. 12). The measurement position is in the vicinity of the upper tape edge (specifically, the region R in FIG. 11A). Acquisition of 2D profiles P1 (L, T) to P3 (L, T) is performed after at least 3 seconds have passed from the start of running, after the running speed stabilizes at 5 m/s, and during one running.

The position L in the 2D profile P1 (L, T) indicates a position in the longitudinal direction (the X-axis direction) of the tape sample MT1 and the running direction of the tape sample MT1, and the position T in the 2D profile P1 (L, T) indicates a position in the width direction (the Y-axis direction) of the tape sample MT1.

Next, the 2D profile Pa(L, T) in the spacing state is obtained by arithmetically averaging the 2D profiles P1(L, T) to P3(L, T) at the same L and T positions. Next, the spacing index srl in the longitudinal direction of the tape sample MT1 and the spacing index srt in the width direction of the tape sample MT1 are calculated from the 2D profile Pa(L, T) in the spacing state as follows.

Profiles in a specified range $R_1$ (see FIG. 12) of the 2D profile Pa (L, T) are averaged at the same positions L in the longitudinal direction (the same positions in the X-axis direction) to calculate an average 1D profile PaL (L) in a specified range $R_1$. Here, the specified range $R_1$ is a range of 500 μm or more and 600 μm or less toward the inside of the tape sample MT1 from one edge of the tape sample MT1 in the width direction. The specified range $R_1$ has an elongated rectangular shape with a width of 100 μm, and both ends of the specified range $R_1$ in the longitudinal direction are set outside the dummy 70.

Figure 13:
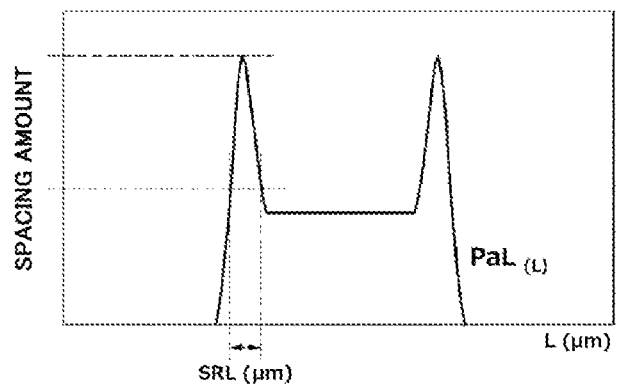
FIG. 13A is a graph illustrating an example of an average 1D profile PaL (L).
FIG. 13B is a graph illustrating an example of an average 1D profile PaT (T).
Figure 13:
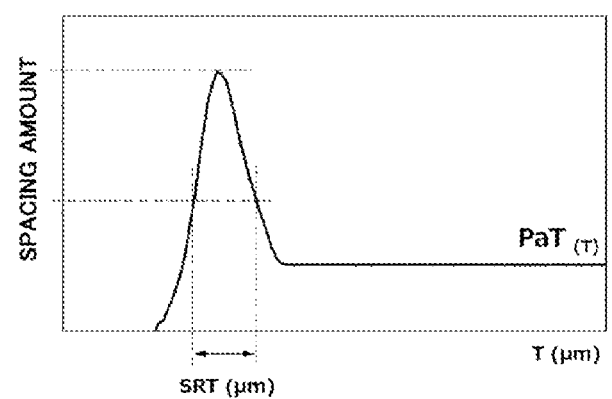

FIG. 13A is a graph illustrating an example of the average 1D profile PaL (L). In the average 1D profile PaL (L), focusing only on the spacing increase region $R_L$ on the upstream side (the left side in FIG. 12) in the running direction of the tape sample MT1, a peak half width of the average 1D profile PaL(L) in this spacing increase region $R_L$ is obtained, and the result is taken as the spacing index srl (μm).

Profiles in a specified range R2 (see FIG. 12) of the 2D profile Pa (L, T) are averaged at the same positions T in the width direction (the same positions in the Y-axis direction) to calculate an average 1D profile PaT (T) in a specified range R2. Here, the specified range R2 is a range of 450 μm or more and 550 μm or less in the running direction of the tape sample MT1 from one end of the sliding surface 70S of the dummy 70 in the width direction (one end of the tape sample MT1 on the upstream side in the running direction). The specified range R2 has an elongated rectangular shape with a width of 100 μm centered on the center line of the dummy 70. One end of the specified range R2 in the longitudinal direction is set outside one edge of the tape sample MT1, and the other end is set at a position inside the tape sample MT1 from the specified range $R_1$.

FIG. 13B is a graph illustrating an example of the average 1D profile PaT (T). Focusing only on the spacing increase region $R_T$ in the average 1D profile PaT (T), a peak half width of the average 1D profile PaT(T) in this spacing increase region $R_T$ is obtained, and the result is taken as the spacing index srt (μm).

The three spacing indexes srl obtained from the three tape samples MT1 as described above are arithmetically averaged, and the calculation result is taken as the spacing index SRL. Similarly, the three spacing indexes srt obtained from the three tape samples MT1 as described above are arithmetically averaged, and the calculation result is taken as the spacing index SRT.

(Average Stiffness)

An average stiffness (the flexural rigidity) of the magnetic tape MT is preferably 1.2 mg weight/μm or less and more preferably 1.0 mg weight/μm or less. When the average stiffness is 1.2 mg weight/μm, the width of the spacing increase region $R_L$ generated on the entrance side of the magnetic head 56 can be narrowed. In addition, the width of the spacing increase region $R_T$ generated in the vicinity of the edge of the magnetic tape MT in the width direction can be narrowed. Thus, the electromagnetic conversion characteristics can be improved. In addition, the running stability can be improved. Narrowing the width of the spacing increase region $R_L$ contributes to the improvement of the electromagnetic conversion characteristics, and narrowing the width of the spacing increase region $R_T$ contributes to the improvement of the running stability.

The stiffness of the magnetic tape MT is obtained as follows. First, the magnetic tape MT accommodated in the cartridge 10 is unwound, and the magnetic tape MT is cut out into a length of 8.0 mm from each of a range of 10 m to 20 m, a range of 30 m to 40 m, a range of 50 m to 60 m, a range of 70 m to 80 m, and a range of 90 m to 100 m in the longitudinal direction from a connecting portion 21 between the magnetic tape MT and the leader tape LT to prepare five samples.

Next, the flexural rigidities S1 to S5 of the five samples are measured. Measurement of the flexural rigidities S1 to S5 is performed according to the ECMA-319 method. The measurement is performed in an environment of 23° C.±2° C. and 40% RH or more and 60% RH or less. Next, the arithmetic average of the measured flexural rigidities S1 to S5 of the five samples is calculated, and the calculated result is taken as the average stiffness S.

(Average Cupping)

An average cupping C of the magnetic tape MT is preferably −1.5 mm or more and +0.5 mm or less and more preferably −0.5 mm or more and 0 mm or less. When the average cupping C of the magnetic tape MT is −1.5 mm or more and +0.5 mm or less, the width of the spacing increase region $R_L$ generated on the entrance side of the magnetic head 56 can be narrowed. Thus, the electromagnetic conversion characteristics can be improved. In addition, the width of the spacing increase region $R_T$ generated in the vicinity of the edge of the magnetic tape MT in the width direction can be narrowed. Thus, the running stability can be improved. Here, the cupping means curvature in the width direction of the magnetic tape MT.

The average cupping C of the magnetic tape MT is obtained as follows. First, the magnetic tape MT accommodated in the cartridge 10 is unwound, and the magnetic tape MT is cut out into a length of 1 m from each of a range of 10 m to 20 m, a range of 30 m to 40 m, a range of 50 m to 60 m, a range of 70 m to 80 m, and a range of 90 m to 100 m in the longitudinal direction from a connecting portion 21 between the magnetic tape MT and the leader tape LT to prepare five samples.

Figure 14:
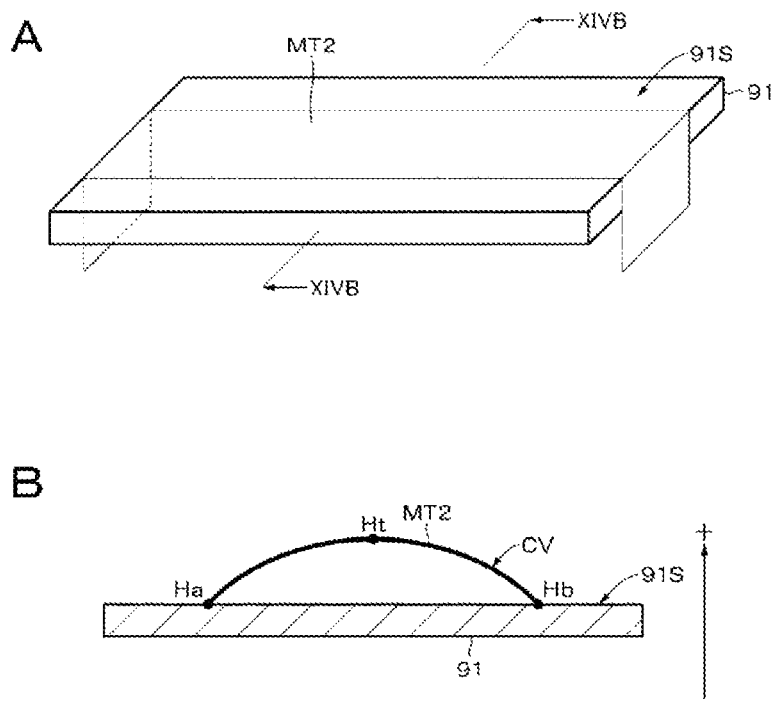
FIG. 14A is a perspective view for explaining a method of calculating a cupping.
FIG. 14B is a cross-sectional view along line XIVB-XIVB of FIG. 14A.

A cupping $C_1$ for one of the five test samples is obtained as follows. First, immediately after one hour has passed from the time when the magnetic tape MT was unwound, a center portion of 300 mm is cut out from a sample having a length of 1 m to be set as a test sample MT2. Next, as shown in FIGS. 14A and 14B, the test sample MT2 is placed on a metal stand 91 having a rectangular smooth placement surface 91S (a size of the placement surface 91S: 100 mm x 200 mm). At this time, the test sample MT2 is placed on the placement surface 91S such that the following conditions are satisfied.

By visual observation, a concave surface of the test sample MT2 is on a side of the placement surface 91S (a convex surface CV is on an upper side).

The long side of the placement surface 91S of the metal stand 91 and the long side of the test sample MT2 are parallel to each other, and the test sample MT2 is positioned at the center of the placement surface 91S of the metal stand 91 in the width direction.

The test sample MT2 hangs down by about 50 mm (about 5 cm) by its own weight from both short sides of the placement surface 91S of the metal stand 91. Here, both ends of the test sample MT2 in the longitudinal direction do not come into contact with the floor or the like.

Next, a height Hc of the convex surface CV of the test sample MT2 is measured by a laser displacement meter. Before the measurement, the placement of the test sample MT2 is finely adjusted such that both edges of the test sample MT2 in the width direction come into contact with the placement surface 91S of the metal stand 91 at the measurement position. The measurement position is selected from a central area of 100 mm in a portion of the test sample MT2 located on the placement surface 91S (a portion having a length of 200 mm). The measurement is performed in an environment of 23° C.±2° C. and 40% RH or more and 60% RH or less.

The height Hc of the convex surface CV of the test sample MT2 is a relative height with respect to the placement surface 91S of the metal stand 91 and is specifically defined by the following formula.

$$Hc = Ht - \tfrac{1}{2} \times (Ha + Hb)$$

Here, in the formula, Ha, Hb, and Ht are as follows.
Ha: A height of a point where one end of the test sample MT2 in the width direction is in contact with the placement surface 91S
Hb: A height of a point where the other end of the test sample MT2 in the width direction is in contact with the placement surface 91S
Ht: A height of a vertex of the convex surface CV of the test sample MT2

The measurement reference positions of Ha, Hb, and Ht are arbitrarily selected from positions lower than the placement surface 91S.

Next, in a case where the magnetic surface (the surface on a side of the magnetic layer 43) of the test sample MT2 is convex, a minus sign "−" is given to the calculated height Hc of the convex surface CV to be taken as a cupping value $C_{1-1}$. That is, calculation of $C_{1-1} = -1 \times Hc$ is performed, resulting in $C_{1-1} < 0$. On the other hand, in a case where the back surface (the surface on a side of the back layer 44) of the test sample MT2 is a convex surface CV, the calculated height He of the convex surface is taken as a cupping value $C_{1-1}$. That is, calculation of $C_{1-1} = Hc$ is performed, resulting in $C_{1-1} > 0$.

The above measurements are performed at five positions, and cupping values $C_{1-1}$ to $C_{1-5}$ are calculated. At this time, measurements are taken at four positions at intervals of 25 mm in the longitudinal direction of the test sample MT2. The arithmetic average of the calculated $C_{1-1}$ to $C_{1-5}$ is calculated, and the result is taken as the cupping $C_1$.

Next, the cuppings $C_2$ to $C_5$ of the remaining four samples are obtained in the same procedure as the cupping $C_1$ has been obtained above. The arithmetic average of $C_1$ to $C_5$ obtained as described above is calculated, and the result is taken as the average cupping C.

4 MANUFACTURING METHOD OF MAGNETIC TAPE

Next, an example of a manufacturing method of the magnetic tape MT having the above-described configuration will be described.

(Preparation Process of Coating Material)

First, an underlayer forming coating material is prepared by kneading and dispersing a non-magnetic powder, a binding agent, and the like in a solvent. Next, a magnetic layer forming coating material is prepared by kneading and dispersing a magnetic powder, a binding agent, and the like in a solvent. For example, the following solvent, a dispersion device, and a kneading device can be used to prepare the magnetic layer forming coating material and the underlayer forming coating material.

Examples of the solvent used to prepare the above-described coating materials include ketone-based solvents such as acetone, methyl ethyl ketone, methyl isobutyl ketone, and cyclohexanone, alcohol-based solvents such as methanol, ethanol, and propanol, ester-based solvents such as methyl acetate, ethyl acetate, butyl acetate, propyl acetate, ethyl lactate, and ethylene glycol acetate, ether-based solvents such as diethylene glycol dimethyl ether, 2-ethoxyethanol, tetrahydrofuran, and dioxane, aromatic hydrocarbon-based solvents such as benzene, toluene, and xylene, halogenated hydrocarbon-based solvents such as methylene chloride, ethylene chloride, carbon tetrachloride, chloroform, and chlorobenzene, and the like. These may be used alone or mixed appropriately.

As the kneading device used to prepare the above-described coating materials, for example, kneading devices such as a continuous twin-screw kneader, a continuous twin-screw kneader capable of multistage dilution, a kneader, a pressure kneader, a roll kneader, and the like can be used, and the present disclosure is not particularly limited to these devices. In addition, as the dispersion device used to prepare the above-described coating materials, for example, dispersion devices such as a roll mill, a ball mill, a horizontal sand mill, a vertical sand mill, a spike mill, a pin mill, a tower mill, a pearl mill (for example, a "DCP mill" manufactured by Erich), a homogenizer, and an ultrasonic disperser can be used, but the present disclosure is not particularly limited to these devices.

(Coating Process)

Next, the underlayer 42 is formed by coating one main surface of the substrate 41 with the underlayer forming coating material and drying it. Subsequently, the magnetic layer 43 is formed on the underlayer 42 by coating the underlayer 42 with the magnetic layer forming coating material and drying it. During drying, the magnetic powder may be magnetically oriented in the thickness direction of the substrate 41 by, for example, a solenoid coil. Further, during drying, the magnetic powder may be magnetically oriented in the running direction (the longitudinal direction) of the substrate 41 and then magnetically oriented in the thickness direction of the substrate 41 by, for example, a solenoid coil. By temporarily subjecting the magnetic powder to orientation in the longitudinal direction in this manner, the degree of vertical orientation (that is, the squareness ratio S1) of the magnetic powder can be further improved. After the magnetic layer 43 is formed, the back layer 44 is formed on the other main surface of the substrate 41. As a result, the magnetic tape MT is obtained.

The squareness ratios S1 and S2 are set to desired values by adjusting, for example, the strength of a magnetic field applied to a coating film of the magnetic layer forming coating material, the concentration of solid content in the magnetic layer forming coating material, and drying conditions (a drying temperature and a drying time) of the coating film of the magnetic layer forming coating material. The strength of the magnetic field applied to the coating film is preferably two times or more and three times or less the coercive force of the magnetic powder. In order to further increase the squareness ratio S1 (that is, to further decrease the squareness ratio S2), it is preferable to improve the dispersion state of the magnetic powder in the magnetic layer forming coating material. Further, in order to further increase the squareness ratio S1, it is also effective to magnetize the magnetic powder at a stage before the magnetic layer forming coating material is injected into an orientation device for magnetically orienting the magnetic powder. The above-mentioned method of adjusting the squareness ratios S1 and S2 may be used alone or in combination of two or more.

(Curing Process)

After the magnetic tape MT is wound into a roll, the underlayer 42 and the magnetic layer 43 are cured by heating the magnetic tape MT in this state.

(Calendering Process)

Next, the obtained magnetic tape MT is subjected to calendering to smooth the surface of the magnetic layer 43.

(Cutting Process)

Next, the magnetic tape MT is cut to a predetermined width (for example, a width of ½ inches). In this manner, the magnetic tape MT is obtained.

(Demagnetization Process and Servo Pattern Writing Process)

Next, a servo pattern may be written on the magnetic tape MT after performing demagnetization of the magnetic tape MT as necessary.

5 OPERATIONS AND EFFECTS

As described above, in the magnetic tape MT according to an embodiment, the spacing index SRL obtained when the magnetic tape MT is slid on the glass pseudo head is 35 µm or less, and the spacing index SRT obtained when the magnetic tape MT is slid on the glass pseudo head is 68 µm or less. As a result, the widths of the spacing increase region $R_L$ and the spacing increase region $R_T$ can be reduced. Therefore, excellent electromagnetic conversion characteristics and running stability can be obtained.

6 MODIFICATION EXAMPLE

In the above-described embodiment, a case where the magnetic tape cartridge is a 1-reel type cartridge 10 has been described, but the magnetic tape cartridge may be 2-reel type cartridge.

Figure 15:
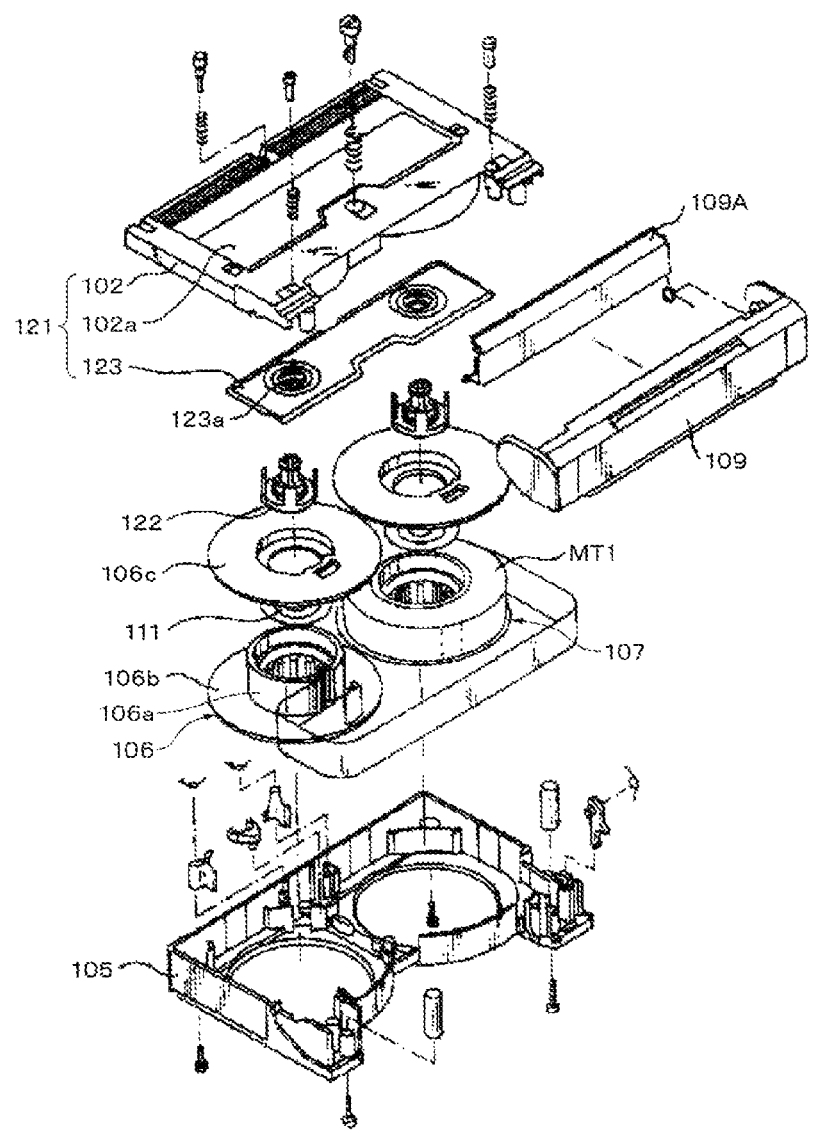
FIG. 15 is an exploded perspective view illustrating an example of a configuration of a cartridge according to a modification example of the embodiment of the present disclosure.

FIG. 15 is an exploded perspective view illustrating an example of a configuration of a 2-reel type cartridge 121. The cartridge 121 includes an upper half 102 made of a synthetic resin, a transparent window member 123 fitted and fixed to a window portion 102a opened on the upper surface of the upper half 102, a reel holder 122 that is fixed to the inside of the upper half 102 to prevent reels 106 and 107 from floating, a lower half 105 that corresponds to the upper half 102, the reels 106 and 107 that are accommodated in a space formed by combining the upper half 102 and the lower half 105, a magnetic tape MT that is wound around the reels 106 and 107, a front lid 109 that closes a front opening formed by combining the upper half 102 and the lower half 105, and a back lid 109A that protects the magnetic tape MT exposed on the front opening.

The reels 106 and 107 are for winding the magnetic tape MT. The reel 106 includes a lower flange 106b having a cylindrical hub portion 106a around which the magnetic tape MT is wound in the center thereof, an upper flange 106c having substantially the same size as the lower flange 106b, and a reel plate 111 sandwiched between the hub portion 106a and the upper flange 106c. The reel 107 has the same configuration as the reel 106.

The window member 123 is provided with attachment holes 123a for assembling the reel holder 122, which is a reel holding means for preventing the reels from floating, at positions corresponding to the reels 106 and 107. The magnetic tape MT is the same as the magnetic tape MT in the embodiment.

EXAMPLES

Hereinafter, the present disclosure will be described below in detail with reference to examples, and the present disclosure is not limited to these examples.

In the following examples and comparative examples, an average aspect ratio of a magnetic powder, an average particle volume of a magnetic powder, an average thickness of a magnetic layer, an average thickness of an underlayer, an average thickness of a substrate (a base film), an average thickness of a back layer, an average thickness of a magnetic tape, a squareness ratio S1 of a magnetic layer in the vertical direction of a magnetic tape, a squareness ratio S2 of a magnetic layer in the longitudinal direction of a magnetic tape, and a arithmetic average roughness Ra of a surface of a magnetic layer are values obtained by the measurement method described in the above-described embodiment.

Example 1

(Preparation Process of Magnetic Layer Forming Coating Material)

A magnetic layer forming coating material was prepared as follows. First, a first composition having the following mixture was kneaded by an extruder. Next, the kneaded first composition and a second composition having the following mixture were added to a stirring tank equipped with a disperser, and premixing was performed. Subsequently, sand mill mixing was further performed and filtering was performed to prepare a magnetic layer forming coating material.

(First Composition)
  Barium ferrite ($BaFe_{12}O_{19}$) magnetic powder (hexagonal plate shape, average aspect ratio of 3.2, average particle volume of 1600 $nm^3$): 100 parts by mass
  Resin solution in which vinyl chloride resin is dispersed in cyclohexanone (resin solution: vinyl chloride resin content of 30% by mass, cyclohexanone content of 70% by mass): 60 parts by mass (Vinyl chloride resin: polymerization degree 300, number average molecular weight Mn=10000, containing $OSO_3K$=0.07 mmol/g, secondary OH=0.3 mmol/g as a polar group)
  Aluminum oxide powder having a medium particle size: 5 parts by mass
  ($\alpha$-$Al_2O_3$, average particle size (D50) of 0.09 μm)
(Second Composition)
  Resin solution in which vinyl chloride resin is dispersed in cyclohexanone (resin solution: vinyl chloride resin content of 30% by mass, cyclohexanone content of 70% by mass): 3.6 parts by mass
  (Vinyl chloride resin: polymerization degree 300, number average molecular weight Mn=10000, containing $OSO_3K$=0.07 mmol/g, secondary OH=0.3 mmol/g as a polar group)
  Aluminum oxide powder having a medium particle size: 5 parts by mass
  ($\alpha$-$Al_2O_3$, average particle size (D50) of 0.09 μm) n-butyl stearate: 2 parts by mass
  Methyl ethyl ketone: 121.3 parts by mass
  Toluene: 121.3 parts by mass
  Cyclohexanone: 60.7 parts by mass
  Carbon black: 2 parts by mass
  (Made by Tokai Carbon Co., Ltd., trade name: Seast TA)
  Finally, polyisocyanate of 4 parts by mass (trade name: coronate L manufactured by Tosoh Corporation) as a curing agent and stearic acid of 2 parts by mass as a lubricant were added to the magnetic layer forming coating material prepared as described above.
(Preparation Process of Underlayer Forming Coating Material)
  An underlayer forming coating material was prepared as follows. First, a third composition having the following mixture was kneaded by an extruder. Next, the kneaded third composition and a fourth composition having the following mixture were added to a stirring tank equipped with a disperser, and premixing was performed. Subsequently, sand mill mixing was further performed and filtering was performed to prepare an underlayer forming coating material.
(Third Composition)
  Needle-like iron oxide powder (non-magnetic powder) having a medium particle size: 100 parts by mass
  ($\alpha$-$Fe_2O_3$, average major axis length of 0.08 μm)
  Vinyl chloride resin: 55.6 parts by mass
  (Resin solution: resin content 30% by mass, cyclohexanone 70% by mass)
  Carbon black: 10 parts by mass
  (average particle size of 20 nm)
(Fourth Composition)
  Polyurethane resin UR8200 (manufactured by Toyo Boseki Kabushiki Kaisha): 18.5 parts by mass
  n-butyl stearate: 2 parts by mass
  Methyl ethyl ketone: 108.2 parts by mass
  Toluene: 108.2 parts by mass
  Cyclohexanone: 18.5 parts by mass
  Finally, polyisocyanate of 4 parts by mass (trade name: coronate L manufactured by Tosoh Corporation) as a curing agent and stearic acid of 2 parts by mass as a lubricant were added to the underlayer forming coating material prepared as described above.
(Preparation Process of Back layer Forming Coating Material)
  A back layer forming coating material was prepared as follows. The following raw materials were mixed in a stirring tank equipped with a disperser and filtering was performed to prepare a back layer forming coating material.
  Carbon black powder (average particle size (D50) 20 nm): 100 parts by mass
  Polyester polyurethane: 100 parts by mass
  (Made by Nippon Polyurethane Industry Co., Ltd., trade name: N-2304)
  Methyl ethyl ketone: 500 parts by mass
  Toluene: 400 parts by mass
  Cyclohexanone: 100 parts by mass
(Coating Process)
  An underlayer and a magnetic layer were formed on one main surface of a long PEN film having an average thickness of 4.0 μm, which is a non-magnetic support (a substrate), as follows using the magnetic layer forming coating material and the underlayer forming coating material which were prepared as described above.

First, an underlayer forming coating material was applied on one main surface of the PEN film, and then the coating film is dried while heating and blowing air over the coating film to form an underlayer having an average thickness of 0.82 μm after calendering.

Next, a magnetic layer forming coating material was applied on the underlayer, and then the coating film is dried while heating and blowing air over the coating film to form a magnetic layer having an average thickness of 80 nm after calendering. Further, the magnetic powder was magnetically oriented in the thickness direction of the PEN film by the neodymium magnet during the drying of the magnetic layer forming coating material. As a result, the squareness ratio S1 in the vertical direction (the thickness direction) of the magnetic tape was set to 65%, and the squareness ratio S2 in the longitudinal direction of the magnetic tape was set to 38%.

Subsequently, a back layer forming coating material was applied on the other main surface of the PEN film, and then the coating film is dried while heating and blowing air over the coating film to form a back layer having an average thickness of 0.3 μm after calendering. In this final drying step, not only the back layer coating film applied immediately before but also both the underlayer coating film and the magnetic layer coating film are dried at the same time. A drying temperature at that time was set to 100° C. The drying temperature of 100° C. is hereinafter referred to as a drying reference temperature. As a result, a magnetic tape is obtained.
(Curing Process)
  After the magnetic tape is wound into a roll, the underlayer and the magnetic layer are cured by heating the magnetic tape at 60° C. for 24 hours in this state.
(Calendering Process)
  Calendering was performed to smooth the surface of the magnetic layer. At this time, a calendering temperature was set at 125° C. and a calendering pressure was set at 255 kg/cm. The calendering temperature of 125° C. is hereinafter referred to as a calendering reference temperature. The calendering pressure of 255 kg/cm is referred to as a calendering reference pressure.

(Cutting Process)

The magnetic tape obtained as described above was cut to a width of ½ inches (12.65 mm). As a result, the magnetic tape having an average thickness of 5.2 μm was obtained.

(Servo Pattern Writing Process)

Five servo bands were formed by writing a servo pattern on the magnetic tape using a servo writer after the magnetic tape was demagnetized. The servo pattern was made to comply with the LTO-8 standard.

Example 2

The average thickness of the PEN film, the average thickness of the underlayer after calendering, and the average thickness of the magnetic layer after calendering were set to values shown in Table 1. A magnetic tape having an average thickness shown in Table 1 was obtained in the same manner as in Example 1 except for the above.

Example 3

A PET film was used as a non-magnetic support. A magnetic tape having an average thickness shown in Table 1 was obtained in the same manner as in Example 1 except for the above.

Examples 4 to 7

In Examples 4 to 7, the average thickness of the PEN film, the average thickness of the underlayer after calendering, and the average thickness of the magnetic layer after calendering were set to values shown in Table 1. In Examples 4 to 7, the calendering temperature was set to be higher than the calendering reference temperature. In Example 6, the calendering pressure was set to be higher than the calendering reference pressure. A magnetic tape having an average thickness shown in Table 1 was obtained in the same manner as in Example 1 except for the above.

Examples 8 and 9

In Examples 8 and 9, a PET film was used as a non-magnetic support. In Examples 8 and 9, the average thickness of the PET film, the average thickness of the underlayer after calendering, and the average thickness of the magnetic layer after calendering were set to values shown in Table 1. In Examples 8 and 9, the calendering temperature was set to be higher than the calendering reference temperature. In Example 8, the calendering pressure was set to be higher than the calendering reference pressure. Further, in Examples 8 and 9, the final drying temperature was set to be higher than the drying reference temperature. A magnetic tape having an average thickness shown in Table 1 was obtained in the same manner as in Example 1 except for the above.

Examples 10 and 11

In Examples 10 and 11, a PET film was used as a non-magnetic support. In Examples 10 and 11, the average thickness of the PET film, the average thickness of the underlayer after calendering, and the average thickness of the magnetic layer after calendering were set to values shown in Table 1. In Examples 10 and 11, the calendering temperature was set to be higher than the calendering reference temperature. A magnetic tape having an average thickness shown in Table 1 was obtained in the same manner as in Example 1 except for the above.

Comparative Example 1

The average thickness of the PEN film, the average thickness of the underlayer after calendering, and the average thickness of the magnetic layer after calendering were set to values shown in Table 1. The calendering temperature was set to be lower than the calendering reference temperature. Further, the final drying temperature was set to be higher than the drying reference temperature. A magnetic tape having an average thickness shown in Table 1 was obtained in the same manner as in Example 1 except for the above.

Comparative Example 2

The average thickness of the underlayer after calendering and the average thickness of the magnetic layer after calendering were set to values shown in Table 1. The calendering temperature was set to be lower than the calendering reference temperature. A magnetic tape having an average thickness shown in Table 1 was obtained in the same manner as in Example 1 except for the above.

Comparative Example 31

A PET film was used as a non-magnetic support. The average thickness of the PET film, the average thickness of the underlayer after calendering, and the average thickness of the magnetic layer after calendering were set to values shown in Table 1. The calendering temperature was set to be lower than the calendering reference temperature. A magnetic tape having an average thickness shown in Table 1 was obtained in the same manner as in Example 1 except for the above.

Comparative Example 4

A PA film was used as a non-magnetic support. The average thickness of the PA film, the average thickness of the underlayer after calendering, and the average thickness of the magnetic layer after calendering were set to values shown in Table 1. The calendering temperature was set to be lower than the calendering reference temperature. A magnetic tape having an average thickness shown in Table 1 was obtained in the same manner as in Example 1 except for the above.

Comparative Examples 5 and 6

The average thickness of the PEN film, the average thickness of the underlayer after calendering, the average thickness of the magnetic layer after calendering, and the average thickness of the back layer after calendering were set to values shown in Table 1. The calendering temperature was set to be higher than the reference temperature. A magnetic tape having an average thickness shown in Table 1 was obtained in the same manner as in Example 1 except for the above.

Comparative Example 7

The average thickness of the PEN film, the average thickness of the underlayer after calendering, and the average thickness of the magnetic layer after calendering were set to values shown in Table 1. The calendering temperature was set to be higher than the reference temperature. A magnetic tape having an average thickness shown in Table 1 was obtained in the same manner as in Example 1 except for the above.

[Evaluation]

The magnetic tapes obtained as described above were evaluated as follows.

(Average Stiffness)

The average stiffness was obtained by the method described in the above embodiment.

(Average Cupping)

The average cupping was obtained by the method described in the above embodiment.

(Spacing State)

The spacing index SRL and the spacing index SRT were obtained by the method described in the above embodiment.

(Electromagnetic Conversion Characteristics)

First, a loop tester (manufactured by Microphysics) was used to acquire a reproduced signal from the magnetic tape. The conditions for acquiring the reproduced signal are shown below.

Head: GMR
Head speed: 1.85 m/s
signal: single recording frequency (10 MHz)
Recording current: optimum recording current Next, the reproduced signal was captured by a spectrum analyzer with a span of 0 to 20 MHz (resolution band width=100 kHz, VBW=30 kHz). Next, the peak of the captured spectrum is set as a signal amount S, the floor noise excluding the peak is integrated from 3 MHz to 20 MHz to be set as a noise amount N, and the ratio S/N of the signal amount S to the noise amount N is obtained as the SNR (signal-to-noise Ratio). Next, the obtained SNR was converted into a relative value (dB) with the SNR of Comparative Example 3 as a reference medium set as a reference (0 dB).

(Running Stability)

First, the magnetic tape was incorporated into an LTO cartridge. Next, the LTO cartridge was loaded into an LTO drive connected to a PC via serial cable communication, and the magnetic tape was run. Next, among five servo bands (servo bands 0, 1, 2, 3, and 4) written on the magnetic tape, a servo band closest to one edge of the magnetic tape in the width direction, that is, a servo band 0, is used. An actuator of a drive head was operated such that the drive head followed a servo track, and the magnetic tape was run. At that time, a statistical value $\sigma_{SW\text{-}0}$ indicating the nonlinearity of the servo pattern was measured from the obtained servo signal. A method described in JP 6624332B was used as a method of measuring the statistical value $\sigma_{SW\text{-}0}$.

Next, $\sigma_{SW\text{-}4}$ was measured using a servo band closest to the other edge of the magnetic tape in the width direction, that is, a servo band 4.

An arithmetic average of the above data was taken, and the obtained value was set as $\sigma_{SW}$ (nm) for the same sample. $\sigma_{SW}$ of Comparative Example 3 is set as 100%, a relative value from that was expressed as relative $\sigma_{SW}$ (%). The smaller the value of $\sigma_{SW}$, the higher the running stability, which is preferable from the viewpoint of the running stability.

Figure 16:
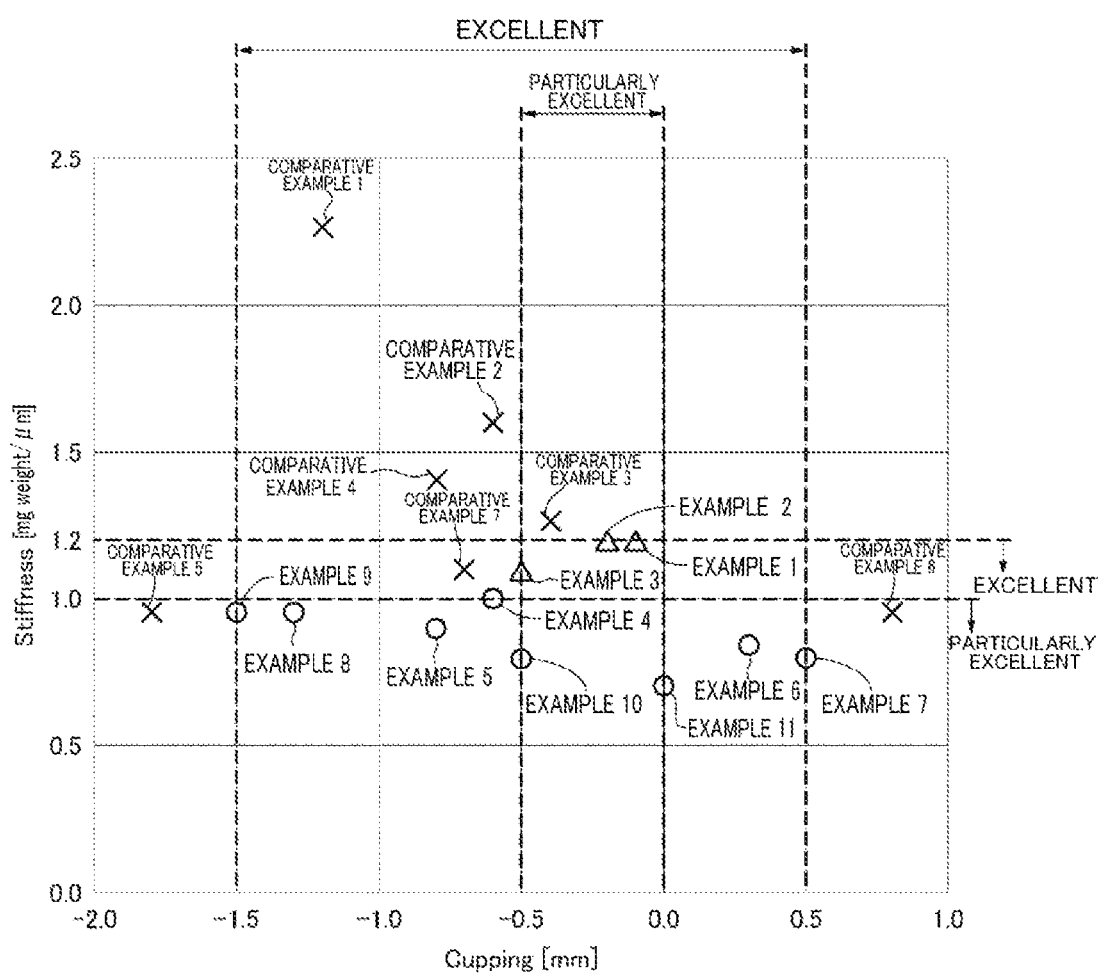
FIG. 16 is a graph illustrating excellent ranges for a stiffness and a cupping.

Table 1 shows a configuration of the magnetic tape, process conditions, and evaluation results. FIG. 16 is a graph illustrating excellent ranges for a stiffness and a cupping.

TABLE 1

| | AVERAGE THICKNESS $T_t$ [μm] | SUBSTRATE AVERAGE THICKNESS $T_s$ [μm] | $T_t/T_s$ | SUBSTRATE MATERIAL | BACK LAYER AVERAGE THICKNESS [μm] | MAGNETIC LAYER AVERAGE THICKNESS [μm] | UNDERLAYER AVERAGE THICKNESS [μm] | ARITHMETIC AVERAGE ROUGHNESS Ra [nm] | AVERAGE STIFFNESS [mg Wt./μm] |
|---|---|---|---|---|---|---|---|---|---|
| COMPARATIVE EXAMPLE 1 | 6.4 | 5.0 | 1.3 | PEN | 0.3 | 0.08 | 1.02 | 2.0 | 2.27 |
| COMPARATIVE EXAMPLE 2 | 5.6 | 4.0 | 1.4 | PEN | 0.3 | 0.08 | 1.22 | 1.8 | 1.60 |
| COMPARATIVE EXAMPLE 3 | 5.6 | 4.5 | 1.2 | PET | 0.3 | 0.08 | 0.72 | 1.8 | 1.26 |
| COMPARATIVE EXAMPLE 4 | 4.7 | 3.6 | 1.3 | PA | 0.3 | 0.08 | 0.72 | 1.8 | 1.40 |
| EXAMPLE 1 | 5.2 | 4.0 | 1.3 | PEN | 0.3 | 0.08 | 0.82 | 1.3 | 1.20 |
| EXAMPLE 2 | 5.3 | 3.6 | 1.5 | PEN | 0.3 | 0.08 | 1.32 | 1.3 | 1.20 |
| EXAMPLE 3 | 5.2 | 4.0 | 1.3 | PET | 0.3 | 0.08 | 0.82 | 1.3 | 1.10 |
| EXAMPLE 4 | 5.1 | 4.2 | 1.2 | PEN | 0.3 | 0.08 | 0.52 | 1.2 | 1.00 |
| EXAMPLE 5 | 4.8 | 3.8 | 1.3 | PEN | 0.3 | 0.08 | 0.62 | 1.2 | 0.90 |
| EXAMPLE 6 | 4.6 | 3.6 | 1.3 | PEN | 0.3 | 0.08 | 0.62 | 1.2 | 0.84 |
| EXAMPLE 7 | 4.6 | 3.6 | 1.3 | PEN | 0.3 | 0.08 | 0.52 | 1.2 | 0.80 |
| EXAMPLE 8 | 5.1 | 4.2 | 1.2 | PET | 0.3 | 0.08 | 0.62 | 1.3 | 0.96 |
| EXAMPLE 9 | 5.1 | 4.2 | 1.2 | PET | 0.3 | 0.08 | 0.52 | 1.3 | 0.96 |
| EXAMPLE 10 | 4.8 | 3.8 | 1.3 | PET | 0.3 | 0.08 | 0.62 | 1.3 | 0.80 |
| EXAMPLE 11 | 4.6 | 3.6 | 1.3 | PET | 0.3 | 0.08 | 0.62 | 1.2 | 0.70 |
| COMPARATIVE EXAMPLE 5 | 5.1 | 4.2 | 1.2 | PEN | 0.5 | 0.08 | 0.32 | 1.3 | 0.96 |
| COMPARATIVE EXAMPLE 6 | 5.1 | 4.2 | 1.2 | PEN | 0.2 | 0.08 | 0.62 | 1.2 | 0.96 |
| COMPARATIVE EXAMPLE 7 | 5.1 | 4.5 | 1.1 | PEN | 0.3 | 0.08 | 0.22 | 1.3 | 1.10 |

TABLE 1-continued

| | AVERAGE CUPPING [mm] | PROCESS CONDITIONS | | | SPACING STATE (ABSOLUTE VALUE) | | ELECTROMAGNETIC CONVERSION CHARACTERISTICS RELATIVE SNR [dB] | RUNNING STABILITY RELATIVE $\sigma_{SW}$ [%] |
|---|---|---|---|---|---|---|---|---|
| | | CALENDER TEMPERATURE | CALENDER PRESSURE | DRYING TEMPERATURE | SRL [μm] | SRT [μm] | | |
| COMPARATIVE EXAMPLE 1 | −1.2 | LOWER TEMPERATURE | REFERENCE | HIGHER TEMPERATURE | 119 | 235 | −0.6 | 106 |
| COMPARATIVE EXAMPLE 2 | −0.6 | LOWER TEMPERATURE | REFERENCE | REFERENCE | 39 | 98 | −0.3 | 102 |
| COMPARATIVE EXAMPLE 3 | −0.4 | LOWER TEMPERATURE | REFERENCE | REFERENCE | 36 | 70 | 0.0 | 100 |
| COMPARATIVE EXAMPLE 4 | −0.8 | LOWER TEMPERATURE | REFERENCE | REFERENCE | 37 | 103 | −0.2 | 102 |
| EXAMPLE 1 | −0.1 | REFERENCE | REFERENCE | REFERENCE | 35 | 67 | 0.1 | 99 |
| EXAMPLE 2 | −0.2 | REFERENCE | REFERENCE | REFERENCE | 35 | 67 | 0.1 | 99 |
| EXAMPLE 3 | −0.5 | REFERENCE | REFERENCE | REFERENCE | 35 | 67 | 0.1 | 99 |
| EXAMPLE 4 | −0.6 | HIGHER TEMPERATURE | REFERENCE | REFERENCE | 33 | 66 | 0.2 | 98 |
| EXAMPLE 5 | −0.8 | HIGHER TEMPERATURE | REFERENCE | REFERENCE | 33 | 66 | 0.3 | 98 |
| EXAMPLE 6 | 0.3 | HIGHER TEMPERATURE | HIGHER PRESSURE | REFERENCE | 34 | 64 | 0.3 | 98 |
| EXAMPLE 7 | 0.5 | HIGHER TEMPERATURE | REFERENCE | REFERENCE | 35 | 64 | 0.1 | 98 |
| EXAMPLE 8 | −1.3 | HIGHER TEMPERATURE | HIGHER PRESSURE | HIGHER TEMPERATURE | 33 | 67 | 0.2 | 99 |
| EXAMPLE 9 | −1.5 | HIGHER TEMPERATURE | REFERENCE | HIGHER TEMPERATURE | 33 | 68 | 0.2 | 99 |
| EXAMPLE 10 | −0.5 | HIGHER TEMPERATURE | REFERENCE | REFERENCE | 32 | 63 | 0.3 | 97 |
| EXAMPLE 11 | 0.0 | HIGHER TEMPERATURE | REFERENCE | REFERENCE | 31 | 63 | 0.4 | 97 |
| COMPARATIVE EXAMPLE 5 | −1.8 | HIGHER TEMPERATURE | REFERENCE | REFERENCE | 34 | 150 | 0.1 | 104 |
| COMPARATIVE EXAMPLE 6 | 0.8 | REFERENCE | REFERENCE | REFERENCE | 38 | 70 | −0.2 | 101 |
| COMPARATIVE EXAMPLE 7 | −0.7 | HIGHER TEMPERATURE | REFERENCE | REFERENCE | 40 | 80 | −0.3 | 101 |

The following can be seen from Table 1.

In a magnetic tape having a magnetic layer with an average value of the arithmetic average roughnesses Ra of 1.3 nm or less of a surface thereof, in a case where the spacing index SRL obtained when the magnetic tape is slid on the glass pseudo head is 35 µm or less and the spacing index SRT obtained when the magnetic tape is slid on the glass pseudo head is 68 µm or less, excellent electromagnetic conversion characteristics and running stability can be obtained.

Although the embodiment and modification example of the present disclosure have been described above in detail, the present disclosure is not limited to the above embodiment and modification example, and various modifications based on the technical spirit of the present disclosure can be made. For example, the configurations, methods, processes, shapes, materials, numerical values, and the like exemplified in the above embodiment and modification example are only examples, and as necessary, different configurations, methods, processes, shapes, materials, numerical values, and the like may be used. The configurations, methods, processes, shapes, materials, numerical values, and the like of the above embodiment and modification example can be combined with each other without departing from the gist of the present disclosure.

The chemical formulas of the compounds and the like exemplified in the above embodiment and modification example are representative ones, and the valences and the like are not limited to the described ones as long as they are general names of the same compound. In the numerical ranges stated in stages in the above embodiment and modification example, the upper limit value or the lower limit value of the numerical range of a certain stage may be replaced with the upper limit value or the lower limit value in the numerical range of another stage. Unless otherwise specified, the materials exemplified in the above embodiment and modification example may be used alone or in combination of two or more.

In addition, the present disclosure may have the following configurations.

(1)

A magnetic recording medium with a tape shape, including:

a substrate that contains polyesters;

an underlayer that is provided on the substrate; and a magnetic layer that is provided on the underlayer and contains a magnetic powder, wherein the magnetic recording medium contains a lubricant, wherein an average value of arithmetic average roughnesses Ra of a surface of the magnetic layer is 1.3 nm or less, and wherein, in a case where an average value of peak half widths of a spacing increase region generated on an entrance side of a glass pseudo head which the magnetic recording medium enters when the magnetic recording medium is slid over the glass pseudo head is set as a spacing index SRL and an average value of peak half widths of a spacing increase region generated in the vicinity of an edge of the magnetic recording medium in a width direction when the magnetic recording medium is slid over the glass pseudo head is set as a spacing index SRT, the spacing index SRL is 35 µm or less and the spacing index SRT is 68 µm or less.

(2)

The magnetic recording medium according to (1), wherein an average thickness Tt of the magnetic recording medium is 5.1 µm or less, and wherein a ratio ($T_t/T_s$) of the average thickness Tt of the magnetic recording medium to an average thickness $T_s$ of the substrate is 1.2 or more.

(3)

The magnetic recording medium according to (1) or (2), wherein an average stiffness of the magnetic recording medium is 1.2 mg weight/µm or less, and an average cupping of the magnetic recording medium is −1.5 mm or more and +0.5 mm or less.

(4)

The magnetic recording medium according to (3), wherein an average stiffness of the magnetic recording medium is 1.0 mg weight/µm or less.

(5)

The magnetic recording medium according to (3) or (4), wherein an average cupping of the magnetic recording medium is −0.5 mm or more and +0 mm or less.

(6)

The magnetic recording medium according to any one of (1) to (5), wherein a flat head is used as a magnetic head for performing recording and reproducing with respect to the magnetic recording medium.

(7)

The magnetic recording medium according to any one of (1) to (6), wherein the magnetic recording medium is used in a recording and reproducing device in which a maximum value of a linear recording density is 550 KFCI or more when a signal is recorded.

(8)

The magnetic recording medium according to any one of (1) to (7), wherein the magnetic powder contains hexagonal ferrite.

(9)

The magnetic recording medium according to any one of (1) to (7), wherein the magnetic powder contains ε-iron oxide or Co-containing spinel ferrite.

(10)

The magnetic recording medium according to any one of (1) to (9), wherein an average particle volume of the magnetic powder is 2500 nm$^3$ or less.

(11)

The magnetic recording medium according to any one of (1) to (10), wherein an average thickness of the magnetic layer is 80 nm or less.

(12)

The magnetic recording medium according to any one of (1) to (11), wherein an average thickness of the underlayer is 0.90 µm or less.

(13)

The magnetic recording medium according to any one of (1) to (12), wherein an average thickness of the substrate is 4.4 µm or less.

(14)

The magnetic recording medium according to any one of (1) to (13), wherein the substrate contains at least one selected from the group consisting of polyethylene terephthalate and polyethylene naphthalate.

(15)

The magnetic recording medium according to any one of (1) to (14), further including:

a back layer that is provided on a side opposite to the underlayer, wherein an average thickness of the back layer is 0.3 µm or less.

(16)
A cartridge including the magnetic recording medium according to any one of (1) to (15).

REFERENCE SIGNS LIST

10 Cartridge
11 Cartridge memory
31 Antenna coil
32 Rectification and power circuit
33 Clock circuit
34 Detection and modulation circuit
35 Controller
36 Memory
36A First storage region
36B Second storage region
41 Substrate
42 Underlayer
43 Magnetic layer
44 Back layer
56 Magnetic head
56A, 56B Servo read head
110 Servo frame
Servo subframe 1
111A A burst
111B B burst
112 Servo subframe 2
112C C burst
112D D burst
113 Servo stripe
MT Magnetic tape
SB Servo band
DB Data bind

The invention claimed is:

1. A magnetic recording medium with a tape shape for use in a recording and reproducing device including a magnetic head, the magnetic recording medium comprising:
a substrate that contains polyesters;
an underlayer that is provided on the substrate; and
a magnetic layer that is provided on the underlayer and contains a magnetic powder,
wherein the magnetic recording medium contains a lubricant,
wherein an average value of arithmetic average roughnesses Ra of a surface of the magnetic layer is 1.3 nm or less, and
wherein, in a case where an average value of peak half widths of a spacing increase region generated on an entrance side of the magnetic head which the magnetic recording medium is configured to enter when the magnetic recording medium is configured to slide over the magnetic head is set as a spacing index SRL and an average value of peak half widths of a spacing increase region generated in the vicinity of an edge of the magnetic recording medium in a width direction when the magnetic recording medium is configured to slide over the magnetic head is set as a spacing index SRT, the spacing index SRL is 35 μm or less and the spacing index SRT is 68 μm or less.

2. The magnetic recording medium according to claim 1, wherein an average thickness Tt of the magnetic recording medium is 5.1 μm or less, and
wherein a ratio ($T_t/T_s$) of the average thickness $T_t$ of the magnetic recording medium to an average thickness $T_s$ of the substrate is 1.2 or more.

3. The magnetic recording medium according to claim 1, wherein an average stiffness of the magnetic recording medium is 1.2 mg weight/μm or less, and an average cupping of the magnetic recording medium is −1.5 mm or more and +0.5 mm or less.

4. The magnetic recording medium according to claim 3, wherein an average stiffness of the magnetic recording medium is 1.0 mg weight/μm or less.

5. The magnetic recording medium according to claim 3, wherein an average cupping of the magnetic recording medium is −0.5 mm or more and 0 mm or less.

6. The magnetic recording medium according to claim 1, wherein the magnetic head is a flat head for performing recording and reproducing with respect to the magnetic recording medium.

7. The magnetic recording medium according to claim 1, wherein the magnetic recording medium is used in the recording and reproducing device in which a maximum value of a linear recording density is 550 KFCI or more when a signal is recorded.

8. The magnetic recording medium according to claim 1, wherein the magnetic powder contains hexagonal ferrite.

9. The magnetic recording medium according to claim 1, wherein the magnetic powder contains ε-iron oxide or Co-containing spinel ferrite.

10. The magnetic recording medium according to claim 1, wherein an average particle volume of the magnetic powder is 2500 nm$^3$ or less.

11. The magnetic recording medium according to claim 1, wherein an average thickness of the magnetic layer is 80 nm or less.

12. The magnetic recording medium according to claim 1, wherein an average thickness of the underlayer is 0.90 μm or less.

13. The magnetic recording medium according to claim 1, wherein an average thickness of the substrate is 4.4 μm or less.

14. The magnetic recording medium according to claim 1, wherein the substrate contains at least one selected from the group consisting of polyethylene terephthalate and polyethylene naphthalate.

15. The magnetic recording medium according to claim 1, further comprising:
a back layer that is provided on a side opposite to the underlayer,
wherein an average thickness of the back layer is 0.3 μm or less.

16. A cartridge comprising the magnetic recording medium according to claim 1.

* * * * *